(12) United States Patent
Yao et al.

(10) Patent No.: US 12,148,043 B2
(45) Date of Patent: Nov. 19, 2024

(54) SYSTEMS AND METHODS FOR ESTIMATING MONETARY LOSS TO AN ACCIDENT DAMAGED VEHICLE

(71) Applicant: PING AN TECHNOLOGY (SHENZHEN) CO., LTD., Shenzhen (CN)

(72) Inventors: Xi Yao, Bellevue, WA (US); Ruei-Sung Lin, Redwood City, CA (US); Kun Li, Saratoga, CA (US); Zijia Chen, Mountain View, CA (US)

(73) Assignee: PING AN TECHNOLOGY (SHENZHEN) CO., LTD, Shenzhen (CN)

( * ) Notice: Subject to any disclaimer, the term of this patent is extended or adjusted under 35 U.S.C. 154(b) by 390 days.

(21) Appl. No.: 17/521,821

(22) Filed: Nov. 8, 2021

(65) Prior Publication Data

US 2023/0142507 A1    May 11, 2023

(51) Int. Cl.
*G06K 9/00* (2022.01)
*G06F 18/213* (2023.01)
*G06F 18/214* (2023.01)
*G06Q 40/08* (2012.01)
*G06V 20/20* (2022.01)

(52) U.S. Cl.
CPC ........... *G06Q 40/08* (2013.01); *G06F 18/213* (2023.01); *G06F 18/214* (2023.01); *G06V 20/20* (2022.01)

(58) Field of Classification Search
CPC .. G06Q 40/08; G06Q 30/0278; G06F 18/213; G06F 18/214; G06V 20/20; G06V 2201/08; G06V 10/764; G06V 10/82
See application file for complete search history.

(56) References Cited

U.S. PATENT DOCUMENTS

2021/0272208 A1*   9/2021   Leise ................... G06Q 40/08

FOREIGN PATENT DOCUMENTS

WO    WO-2020155790 A1 *   8/2020

* cited by examiner

*Primary Examiner* — Xin Jia
(74) *Attorney, Agent, or Firm* — BAYES PLLC

(57) ABSTRACT

Embodiments of the disclosure provide systems and methods for estimating an amount of monetary loss to an accident damaged vehicle. An exemplary system includes a communication interface configured to receive one or more accident images taken of an accident damaged vehicle. It also includes a database for storing loss data of one or more past vehicles, and each past vehicle is associated with a historical accident. It further includes a processor coupled to the communication interface and the database. The processor is configured to detect the accident damaged vehicle in the one or more accident images, identify one or more most similar past vehicles, and estimate the amount of monetary loss to the accident damaged vehicle based on the loss data of the one or more past vehicles.

20 Claims, 11 Drawing Sheets

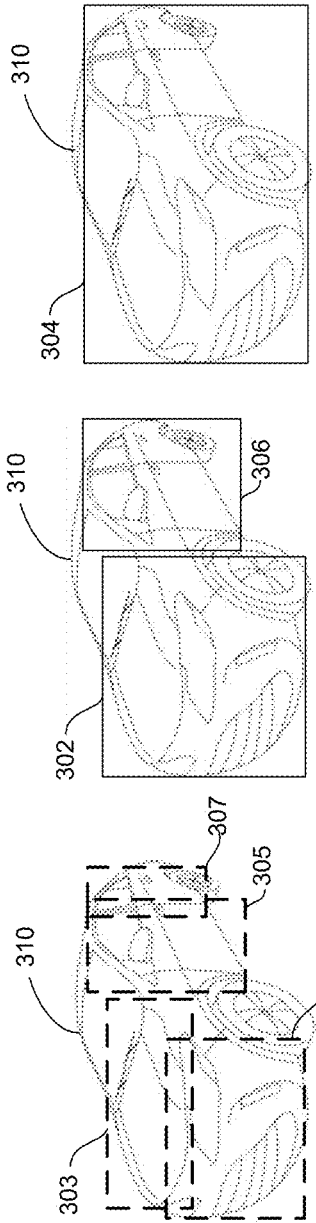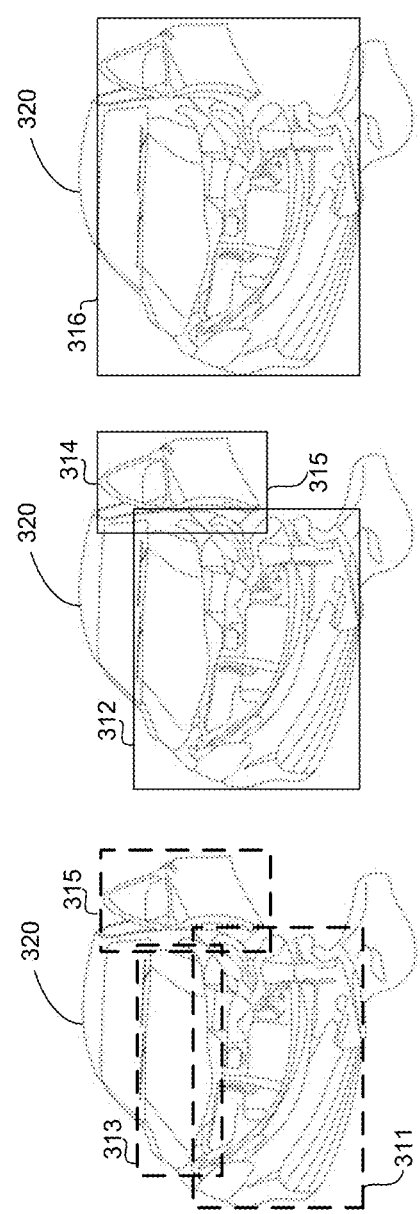

| Case No. | Make | Model | Year | Damaged Parts | Cost of Replacement Part ($) | Parts Category | Labor Cost Total ($) | Labor Hours | Labor Cost ($)/Hr | Total Repair Cost ($) | Value of Vehicle ($) | Total Loss? |
|---|---|---|---|---|---|---|---|---|---|---|---|---|
| 345 | Toyota | Camry | 2014 | Windshield | 1,000 | Body Part | 80 | 1.0 | 80 | 1,080 | 12,000 | N |
| 345 | Toyota | Camry | 2014 | Front Bumper | 800 | Body Part | 40 | 0.5 | 80 | 840 | 12,000 | N |
| 346 | Toyota | Camry | 2016 | Windshield | 1,200 | Body Part | 120 | 1.5 | 80 | 1,320 | 14,000 | N |
| 347 | Ford | Fusion | 2020 | Passenger Airbag | 500 | Electrical Lighting System | 120 | 1.5 | 80 | 620 | 23,000 | N |

SYSTEMS AND METHODS FOR ESTIMATING MONETARY LOSS TO AN ACCIDENT DAMAGED VEHICLE

TECHNICAL FIELD

The present disclosure relates to loss estimation for a traffic accident, and more particularly to estimating a monetary loss to a vehicle damaged in a traffic accident.

BACKGROUND

After receiving a claim for a vehicle damaged in a traffic accident, an insurance company may inspect vehicle damage and estimate a monetary loss to the accident damaged vehicle. Traditionally, a claims adjuster is assigned to the accident scene for photographing and verifying the accident, after which a towing company may pull the accident damaged vehicle to a designated garage for a professional damage determination and monetary loss estimation. However, the traditional method has high labor costs, and is very time-consuming and inefficient for claim processing.

Recently, a few artificial intelligence (AI)-based damage determination systems are used to estimate monetary losses to vehicles with minor damage. The systems may use deep learning classification models to identify each damaged vehicle part and the corresponding degree of damage to the part. The systems may further determine a repair cost (e.g., an amount of monetary loss) for the damaged vehicle part based on the degree of the damage and a price list of parts and labor. But the systems rely on a substantial amount of elaborate manual labeling of different types of damage and cannot automatically estimate a total monetary loss to a vehicle with major damage. Some other systems can determine large-scale damage based on comparing each damaged part with historical accident data in a database. However, the comparison relies on a lot of manual image annotations which are very time-consuming and labor-intensive.

To solve the above problems, embodiments of the present disclosure provide systems and methods for estimating a monetary loss to an accident damaged vehicle in a large-scale traffic accident based on the amount of monetary losses to past vehicles.

SUMMARY

Embodiments of the disclosure provide a system for estimating an amount of monetary loss to an accident damaged vehicle. An exemplary system includes a communication interface configured to receive one or more accident images taken of an accident damaged vehicle. It also includes a database for storing loss data of one or more past vehicles, and each past vehicle is associated with a historical accident. It further includes a processor coupled to the communication interface and the database. The processor is configured to detect the accident damaged vehicle in the one or more accident images, identify one or more most similar past vehicles, and estimate the amount of monetary loss to the accident damaged vehicle based on the loss data of the one or more most similar past vehicles.

Embodiments of the disclosure also provide a model training device for training a model for estimating an amount of monetary loss to an accident damaged vehicle. An exemplary model training device includes a communication interface configured to receive training data representative of one or more past vehicles, and each past vehicle is associated with a historical accident. It also includes a data sampling unit configured to select one or more baseline cases and one or more supporting cases associated with each selected baseline case. It further includes a model generation unit configured to obtain a trained model based on the one or more base line cases and the one or more supporting cases. The trained model is applied to the accident damaged vehicle to estimate the amount of monetary loss to the accident damaged vehicle.

Embodiments of the disclosure also provide a method for estimating an amount of monetary loss to an accident damaged vehicle. An exemplary method includes receiving one or more accident images taken of the accident damaged vehicle, detecting the accident damaged vehicle in the one or more accident images, receiving loss data of one or more past vehicles, identifying one or more most similar past vehicles, and estimating the amount of monetary loss to the accident damaged vehicle based on the loss data of the one or more most similar past vehicles.

Embodiments of the disclosure further provide a non-transitory computer-readable medium having instructions stored thereon that, when executed by at least one processor, causes the at least one processor to perform a method for estimating an amount of monetary loss to an accident damaged vehicle. An exemplary method includes receiving one or more accident images taken of the accident damaged vehicle, detecting the accident damaged vehicle in the one or more accident images, receiving loss data of one or more past vehicles, identifying one or more most similar past vehicles, and estimating the amount of monetary loss to the accident damaged vehicle based on the loss data of the one or more most similar past vehicles.

It is to be understood that both the foregoing general description and the following detailed description are exemplary and explanatory only and are not restrictive of the invention, as claimed.

BRIEF DESCRIPTION OF THE DRAWINGS

FIGS. 3A-3F illustrate detected vehicle parts in exemplary vehicle images, according to embodiments of the disclosure.

FIG. 4 illustrates an exemplary table of loss and repair for past vehicles, according to embodiments of the disclosure.

DETAILED DESCRIPTION

Figure 1:
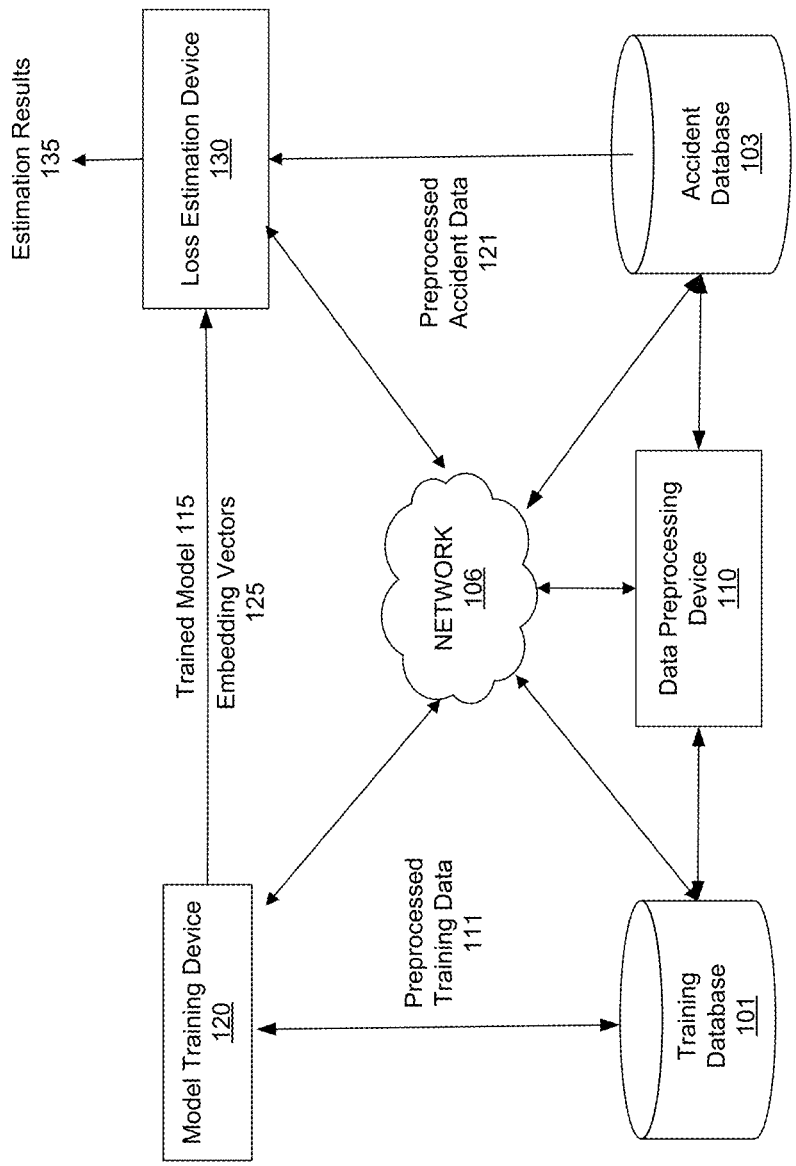
FIG. 1 illustrates an exemplary monetary loss estimation system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

The disclosed systems and methods may estimate an amount of monetary loss to an accident damaged vehicle. In some embodiments, the disclosed systems may include a data preprocessing device, a model training device, and a loss estimation device. For example, an exemplary data preprocessing device may detect parts of a vehicle in an image. The vehicle image may be an image of a past vehicle involved in a historical accident, which, in this case, may be referenced as an "historical image" according to the present disclosure, such as vehicle images 201 described herein. The historical image may be stored in a training database. As another example, the vehicle image may be an image of an accident damaged vehicle stored in an accident database that waits for a loss estimation, which, in this case, may be referenced as an "accident image" according to the present disclosure, such as vehicle images 203 described herein. The data preprocessing device may further extract the vehicle body area from the image based on the detected parts and determine a view angle of the vehicle in the image based on a spatial relationship of the detected parts. In some embodiments, the data preprocessing device may also generate a similarity label for each pair of past vehicles based on their loss data (such as the loss and/or repair information) stored in the training database.

In some embodiments, an exemplary model training device may train models (e.g., embedded neural networks) using data of the past vehicles (e.g., preprocessed images of the past vehicles, a collision direction of the past vehicle, similarity labels between each pair of the past vehicles). The model training device may further evaluate the trained models and select an optimal model to generate a batch of embedding vectors for the past vehicles. The optimal model may further generate another batch of embedding vectors for the accident damaged vehicle.

In some embodiments, an exemplary loss estimation device may calculate a similarity for each pair of embedding vectors of each past vehicle and the accident damaged vehicle. The loss estimation device may further identify k past vehicles having most similar embedding vectors as that of the accident damaged vehicle, where k is a natural number (i.e., 1, 2, 3, 4, . . . ). The loss estimation device may also estimate a total monetary loss to the accident damaged vehicle based on the monetary losses to the k identified past vehicles. The loss estimation device may additionally estimate a monetary loss to each part and the corresponding labor cost of the accident damaged vehicle. The loss estimation device may also determine whether the accident damaged vehicle suffered a total loss based on the similarity between each pair of embedding vectors of each past vehicle and the accident damaged vehicle. The loss estimation device may further determine a confidence level based on the k identified past vehicles. If the confidence level is below a predetermined threshold, the monetary loss to the accident damaged vehicle may be manually determined by a claim professional (e.g., claims adjuster).

FIG. 1 illustrates an exemplary monetary loss estimation system 100 (referred to as "system 100" hereafter), according to embodiments of the disclosure. In some embodiments, system 100 may estimate a monetary loss to an accident damaged vehicle based on k past vehicles having image features (which can be represented by, e.g., embedding vectors) similar to the accident damaged vehicle. As shown in FIG. 1, system 100 may include components for performing three phases, a data preprocessing phase, a training phase, and a loss estimation phase. To perform the data preprocessing phase, system 100 may include a training database 101, an accident database 103, and a data preprocessing device 110. To perform the training phase, system 100 may include training database 101 and a model training device 120. To perform the loss estimation phase, system 100 may include accident database 103 and a loss estimation device 130. In some embodiments, some components of system 100 shown in FIG. 1 may be spared. For example, when models and embedding vectors for estimating a monetary loss to the accident damaged vehicle are pre-trained and provided, system 100 may not need training database 101 or model training device 120.

In some embodiments, system 100 may optionally include a network 106 to facilitate the communication among the various components of system 100, such as databases 101 and 103, and devices 110, 120 and 130. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices. Network 106 may provide speed and bandwidth sufficient for transmitting data between the abovementioned components so that the time lag is minimized and real-time processing of the monetary loss estimation is not affected.

In some embodiments, the various components of system 100 may be remote from each other or in different locations, and be connected through network 106 as shown in FIG. 1. In other embodiments, certain components of system 100 may be located on the same site or inside one device, resulting in a high level of system integration. For example, training database 101 may be located on-site with or be part of model training device 120 or data preprocessing device 110. Similarly, accident database 103 may be located on-site with or be part of data preprocessing device 110 or loss estimation device 130. As another example, data preprocessing device 110, model training device 120, and loss estimation device 130 may be inside the same computer or processing device.

As shown in FIG. 1, data preprocessing device 110 may communicate with training database 101 to receive one or more sets of training data (e.g., images of past vehicles, loss and/or repair information of the past vehicles, etc.). Data preprocessing device 110 may process the received data and return the processed results to training database 101. For example, data preprocessing device 110 may detect parts in a received image of the past vehicle using a pre-trained deep learning network model (e.g., Single-Shot Detector, Faster-RCNN, etc.). Data preprocessing device 110 may further detect a vehicle body and determine a view angle of the vehicle (e.g., front view, left view, front-left view, etc.) in the received image of the past vehicle based on a spatial relationship of the detected parts of the past vehicle. The processed results (e.g., a detected vehicle body, a determined view angle of the past vehicle, etc.) can be stored in training database 101 for training a model to generate embedding vectors of the past vehicle. In some embodiments, data preprocessing device 110 may additionally calculate a similarity between each pair of past vehicles based on the loss data (such as the loss and/or repair information) of the past vehicles stored in training database 101.

In some embodiments, data preprocessing device 110 may apply a similar preprocessing to images of the accident damaged vehicle stored in accident database 103. For example, data preprocessing device 110 may use the same pre-trained deep learning network model to detect parts in a received image of the accident damaged vehicle. Data preprocessing device 110 may further detect a vehicle body and determine a view angle of the accident damaged vehicle in the received image of the accident damaged vehicle based on a spatial relationship of the detected parts of the accident damaged vehicle. The processed results (e.g., a detected vehicle body, a determined view angle of the accident damaged vehicle, etc.) can be stored in accident database 103 for estimating the amount of monetary loss to the accident damaged vehicle.

In some embodiments, the data preprocessing phase may be performed online or offline. An online data preprocessing refers to performing the data preprocessing phase contemporarily with the training and loss estimation phases, e.g., processing images and loss and/or repair information in real-time just prior to training the models and estimating the monetary loss to the accident damaged vehicle. An online data preprocessing for training data may have the benefit of obtaining most updated models based on the training data that is then available. However, an online data preprocessing for training data may be computationally costly to perform and may not always be possible if the data (e.g., image data and/or loss data) is large. Consistent with the present disclosure, an offline training may be used where the data preprocessing phase is performed separately from the training and loss estimation phase. The training data can be preprocessed offline and saved and reused for training models and estimating losses for the accident damaged vehicle. In some embodiments, the data preprocessing of the accident damaged vehicle (e.g., detecting a body area of the accident damaged vehicle, determining a view angle of the accident damaged vehicle, etc.) may be performed online if the data size (e.g., images) is not large.

Data preprocessing device 110 may be implemented with hardware specially programmed by software that performs the data process. For example, data preprocessing device 110 may include a processor and a non-transitory computer-readable medium. The processor may conduct the data process by performing instructions of a data process stored in the computer-readable medium. Data preprocessing device 110 may additionally include input and output interfaces to communicate with training database 101, accident database 103, network 106, and/or a user interface (not shown). The user interface may be used for selecting data sets, adjusting one or more parameters of the data process, and/or selecting or modifying a framework of the deep learning models.

Figure 2:
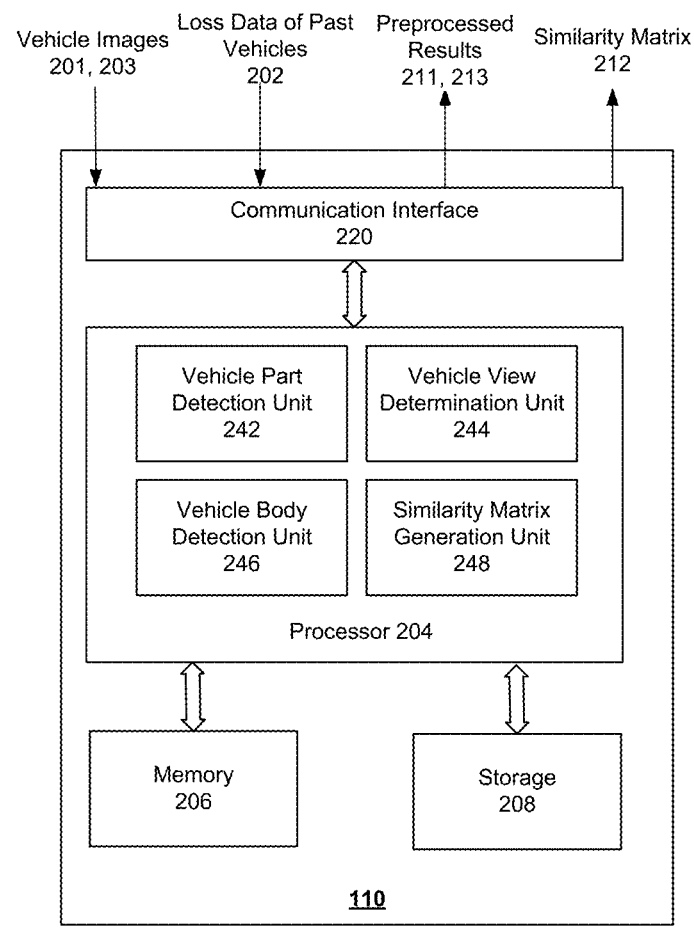
FIG. 2 illustrates a block diagram of an exemplary data preprocessing device illustrated in FIG. 1, according to embodiments of the disclosure.

FIG. 2 illustrates a block diagram of an exemplary data preprocessing device 110 illustrated in FIG. 1, according to embodiments of the disclosure. In some embodiments, as shown in FIG. 2, data preprocessing device 110 may include a communication interface 220, a processor 204, a memory 206, and a storage 208. In some embodiments, data preprocessing device 110 may include different modules in a single device, such as an integrated circuit (IC) chip (implemented as an application-specific integrated circuit (ASIC) or a field-programmable gate array (FPGA)), or separate devices with dedicated functions. In some embodiments, one or more components of data preprocessing device 110 may be located in a cloud, or alternatively in a single location (such as a mobile device) or distributed locations. Components of data preprocessing device 110 may be in an integrated device, or distributed at different locations but communicate with each other through a network (not shown).

Communication interface 220 may receive data from components such as training database 101 or accident database 103 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 220 can be an integrated services digital network (ISDN) card, cable modem, satellite modem, or a modem to provide a data communication connection. As another example, communication interface 220 can be a local area network (LAN) card to provide a data communication connection to a compatible LAN. Wireless links can also be implemented by communication interface 220. In such an implementation, communication interface 220 can send and receive electrical, electromagnetic or optical signals that carry digital data streams representing various types of information via a network.

Consistent with some embodiments, communication interface 220 may receive historical images (e.g., vehicle images 201) and/or loss data of one or more past vehicles 202 from training database 101. In other embodiments, communication interface 220 may receive accident images (e.g., vehicle images 203) from accident database 103. Vehicle images 203 may include an accident damaged vehicle of various views, and the accident damaged vehicle is waiting for monetary loss estimation by loss estimation device 130. Communication interface 220 may further provide the received data to storage 208 for storage or to processor 204 for processing.

Processor 204 may be a processing device that includes one or more general processing devices, such as a microprocessor, a central processing unit (CPU), a graphics processing unit (GPU), and the like. More specifically, processor 204 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. Processor 204 may also be one or more dedicated processing devices such as application specific integrated circuits (ASICs), field programmable gate arrays (FPGAs), digital signal processors (DSPs), system-on-chip (SoCs), and the like.

Processor 204 may be configured as a separate processor module dedicated to performing processing vehicle images 201, 203 and loss data of past vehicles 202. Alternatively, processor 204 may be configured as a shared processor module for performing other functions. Processor 204 may be communicatively coupled to memory 206 and/or storage 208 and configured to execute the computer-executable instructions stored thereon.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a Read-Only Memory (ROM), a flash memory, a dynamic Random-Access Memory (RAM), and a static RAM. Memory 206 and/or storage 208 may store one or more computer programs that may be executed by processor 204 to perform the data processing disclosed herein. For example, memory 206 and/or storage 208 may store program(s) that may be executed by processor 204 to detect vehicle parts in the received vehicle image and/or calculate loss similarity between each pair of past vehicles. In one example, memory 206 may be a RAM integrated into data preprocessing device 110, while storage 208 may be a ROM detachably inserted into a slot provided inside data preprocessing device 110.

Memory 206 and/or storage 208 may further store information and data used by processor 204. For instance, memory 206 and/or storage 208 may store various types of data, such as vehicle images 201, 203 received from training database 101 or accident database 103, and loss data of past vehicles 202. Memory 206 and/or storage 208 may also store intermediate data, such as the detected parts of vehicles, spatial relationships of the detected parts of vehicles, similarity scores of parts of each pair of past vehicles. Memory 206 and/or storage 208 may further store various deep learning models used by processor 204, such as Single-Shot Detector, Faster-RCNN, etc. The various types of data may be stored permanently, removed periodically, or disregarded immediately after each frame of data is processed.

As shown in FIG. 2, processor 204 includes multiple modules, such as a vehicle part detection unit 242, a vehicle view determination unit 244, a vehicle body detection unit 246, a similarity matrix generation unit 248, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 242, 244, 246 and 248 all within one processor 204, it is contemplated that these units may be distributed among multiple processors located near or remotely with each other. According to the present disclosure, the number and type of these modules are not limited to those shown in FIG. 2.

In some embodiments, units 242, 244, 246 and 248 of FIG. 2 may execute computer instructions to perform vehicle detection and similarity matrix generation. In some embodiments, vehicle part detection unit 242 may receive 20 to 50 images of each vehicle (e.g., past vehicle or the accident damaged vehicle). Vehicle part detection unit 242 may further apply a pre-trained learning model (e.g., Single-Shot Detector, Faster-RCNN, etc.) to each received image of the vehicle. For example, FIGS. 3A-3F illustrate detected vehicle parts in exemplary vehicle images, according to embodiments of the disclosure. As shown in FIG. 3A, bounding box 301 (illustrated in a dashed rectangle) shows a detected front bumper of a vehicle 310. Bounding box 303 (illustrated in a dashed rectangle) shows a detected front hood of vehicle 310. Bounding boxes 305 and 307 (illustrated in dashed rectangles) show a detected left front door and a detected left rear door of vehicle 310, respectively. Similarly, as shown in FIG. 3D, bounding boxes 311 and 313 (illustrated in dashed rectangles) show a detected front bumper and a detected front hood of a vehicle 320, respectively. Bounding box 315 (illustrated in a dashed rectangle) shows a detected left front door of vehicle 320.

In some embodiments, vehicle part detection unit 242 may also calculate a centroid and/or dimensions of each bounding box to filter the detected results. For example, if a dimension (e.g., length or width) of the bounding box of the detected vehicle part is less than a preset threshold (e.g., one tenth of the length or width of the vehicle image), the detected vehicle part may not be used for further processing (e.g., determining a view angle of the vehicle). As another example, if the centroid of the bounding box is too close to any boundary of the vehicle image (e.g., a distance between the centroid of the bounding box and the boundary is less than a preset threshold), the detected vehicle part in the bounding box may not be used for further processing. In some embodiments, if two or more identical vehicle parts (e.g., two front bumpers) or parts on opposite vehicle sides (e.g., a left front door and a right front door) are detected in different locations of the vehicle image, the vehicle image may include more than one vehicle. The vehicle image thereby may be removed from further processing by other units in processor 204 (e.g., units 244, 246 or 248).

In some embodiments, vehicle view determination unit 244 may determine a view angle of the vehicle in the image based on the spatial relationship of the detected vehicle parts. For example, vehicle view determination unit 244 may merge the bounding boxes of vehicle parts on a same side of the vehicle (e.g., front side, rear side, left side, or right side). As shown in FIG. 3B, bounding boxes 301 and 303 in FIG. 3A are merged to form a surrounding bounding box 302 because the front hood and the front bumper are both on the front side of vehicle 310. Bounding boxes 305 and 307 in FIG. 3A are merged to form a surrounding bounding box 306 because the left front door and the left rear door are both on the left side of vehicle 310. Similarly, bounding boxes 311 and 313 in FIG. 3D are merged to form a surrounding bounding box 312 in FIG. 3E because the front hood and the front bumper are both on the front side of vehicle 320. Bounding box 315 by itself forms a surrounding bounding box 314 in FIG. 3E because only one vehicle part (e.g., the left front door) on the left side of vehicle 320 is detected.

In some embodiments, vehicle view determination unit 244 may determine the vehicle view in the vehicle image based on the formed surrounding bounding boxes. For example, two surrounding bounding boxes shown in FIG. 3B are on the front side and left side of vehicle 310, vehicle view determination unit 244 may thereby determine that the view angle of vehicle 310 is left front. Similarly, vehicle 320 is in a left front view in FIG. 3D because two surrounding bounding boxes are generated by vehicle view determination unit 244. As another example, if vehicle parts detected by vehicle part detection unit 242 are all on a same side of the vehicle and only one surrounding bounding box is generated by vehicle view determination unit 244, the vehicle may be in a single view angle of the vehicle image (e.g., front view, rear view, left view, or right view). As a result, in some embodiments, each processed vehicle can be categorized into one of eight view angles: front view, rear view, left view, right view, left front view, left rear view, right front view, and right rear view. It is understood that, with the teaching of the present disclosure, an ordinary person of skill in the art may design system 100 to be able to categorize the processed vehicle into other number of view angles, such as four (no oblique views), twelve (with views from an upper angle), sixteen (with views from both an upper angle and a lower angle), etc.

In some embodiments, vehicle body detection unit 246 may determine a vehicle body area in the vehicle image based on the bounding boxes of the detected vehicle parts. For example, vehicle body detection unit 246 may merge all bounding boxes to form a surrounding bounding box that includes a vehicle body area. As shown in FIG. 3C, a surrounding bounding box 304 is formed to include all areas of bounding boxes 301, 303, 305, and 307 in FIG. 3A. The image area of surrounding bounding box 304 includes a body area of vehicle 310. Similarly, a surrounding bounding box 306 in FIG. 3F is formed based on bounding boxes 311, 313, and 315 in FIG. 3D. In some embodiments, communication interface 220 may send one or more of preprocessed results 211, 213 (e.g., the view angle of the vehicle in the vehicle image, an image area of the vehicle body, etc.) of vehicle images 201, 203 back to training database 101 and/or accident database 103.

In some embodiments, similarity matrix generation unit 248 may generate a similarity correlation matrix of past vehicles (e.g., similarity matrix 212) based on loss data of past vehicles 202, which can include loss and/or repair information of the past vehicles. For example, FIG. 4 illustrates an exemplary table 400 of loss and repair for past vehicles, according to embodiments of the disclosure. In Table 400, each past vehicle has a unique identification number (e.g., Case No). Table 400 also records loss and repair details of the past vehicles damaged in historical accidents. As shown in FIG. 4, table 400 may include vehicle information (e.g., make, model, year, value of vehicle), and repair information of each damaged part (e.g., name of damaged part, cost of replacement part, part category, total labor cost, labor hours, labor cost per hour, total repair cost, and whether the vehicle suffered a total loss). In some embodiments, similarity matrix generation unit 248 may calculate a similarity of the amount of monetary losses between each pair of past vehicles (e.g., in historic accident cases).

In some embodiments, similarity matrix generation unit 248 may use loss and/or repair information of major vehicle parts to calculate the damage similarity of each pair of the vehicles. For example, if a damaged part of the vehicle is in a category directed to one of the major vehicle parts, such as "Body Part," "Engine and Transmission," "Electrical Lighting System," or "Chassis Part," the monetary loss to the damaged part (e.g., Total Repair Cost) may be used to calculate the damage similarity. If a damaged part is not a major vehicle part, the monetary loss to the damaged part may not be used for the damage similarity calculation. In some embodiments, similarity matrix generation unit 248 may not use certain damaged parts of the major vehicle parts to calculate the damage similarity. For example, if a damaged part belongs to one of the major vehicle parts but the damaged part locates in a portion of the vehicle body not visible to a common viewer (e.g., bottom portion), the damaged part may not be accounted for in the damage similarity calculation.

In some embodiments, similarity matrix generation unit 248 may further determine a labor cost of repairing the damaged part based on table 400. The repair can either be restoring the damaged part to its prior condition or replacing it with a replacement part. For example, similarity matrix generation unit 248 may execute a stored program (e.g., an algorithm of string matching) to map a damaged part (e.g., Passenger Airbag of Case No. 347 in FIG. 4) to the corresponding labor cost of repairing the damaged part (120 in FIG. 4). Similarity matrix generation unit 248 may execute another algorithm of string matching to map the damaged part (Passenger Airbag of Case No. 347 in FIG. 4) to the corresponding cost of replacement part (500 in FIG. 4). As a result, a total repair cost of the damage part may be calculated based on the mapped labor cost of repairing the damaged part and the cost of replacement part. For example, the total repair cost for Case No. 347 in FIG. 4 can be calculated as a sum of the labor cost and the cost of replacement part, which equals to 620. In other embodiments, the total repair cost of the damage part may be pre-calculated and stored in table 400. For example, similarity matrix generation unit 248 may execute an algorithm of string matching to map the name of a damaged part (e.g., Passenger Airbag in the column of "Damaged Parts" for Case No. 347 in FIG. 4) to the corresponding total repair cost of the damaged part (620 in the column of "Total Repair Cost ($)" as shown in FIG. 4).

In some embodiments, the similarity of two damaged vehicles can be determined based on damage similarities of each pair of parts in the two damaged vehicles. For example, a damage similarity of identical parts (e.g., front bumper) $p_1$ and $p_2$ in vehicles $a_1$ and $a_2$ can be calculated according to equation (1):

$$z=\min(m,n)/\max(m,n) \qquad (1),$$

where z is the damage similarity of two parts $p_1$ and $p_2$, min(m, n) is the smaller value of m and n, max (m, n) is the bigger value of m and n, m is the dollar amount of monetary loss (e.g., total loss cost in table 400) of part $p_1$ in vehicle $a_1$, and n is the dollar amount of monetary loss (e.g., total loss cost in table 400) of part $p_2$ in vehicle $a_2$. If m=0 and n=0 (e.g., parts $p_1$ and $p_2$ are not damaged), the damage similarity of parts $p_1$ and $p_2$ equals a default value (e.g., 1).

In some embodiments, the similarity of two damaged vehicles can further be calculated based on an average (e.g., harmonic mean) of the damage similarities of each pair of parts in the two damaged vehicles. For example, if damaged vehicles $c_1$ and $c_2$ are of a same model and each vehicle has three parts, the similarity between the amount of monetary losses to vehicles $c_1$ and $c_2$ can be calculated according to equation (2):

$$S=3\cdot(z_1\cdot z_2\cdot z_3)/(z_1+z_2+z_3) \qquad (2),$$

where S is the similarity between the amount of monetary losses to vehicles $c_1$ and $c_2$, and $z_1$, $z_2$, and $z_3$ are damage similarities of each pair of the three parts, respectively. In some embodiments, $z_1$, $z_2$, and $z_3$ can be calculated according to equation (1).

In some embodiments, if similarity matrix generation unit 248 receives loss data of N damaged vehicles from the training database, unit 248 may generate an N-by-N similarity correlation matrix (e.g., similarity matrix 212 in FIG. 2) based on the loss data of the N damaged vehicles (N is a natural number). Each element of the N-by-N similarity correlation matrix is a similarity between the amount of the monetary losses to a pair of vehicles that can be calculated according to equations (1) and (2). For example, a value of the element at the xth row and yth column is a damage similarity between the amount of the monetary losses between past vehicles x and y. In some embodiments, the similarity is calculated between vehicles of a same model. For example, similarity matrix generation unit 248 may determine a similarity between Case No. 345 and Case No. 346 in FIG. 4, because vehicles of Case No. 345 and Case No. 346 are of the same model (e.g., Camry).

Returning to FIG. 2, communication interface 220 may send preprocessed results 211 (e.g., an image area of the training vehicle body and the corresponding vehicle view information) and similarity matrix 212 to the training database 101, if data preprocessing device 110 processes training data (e.g., vehicle image 201 and loss data of past vehicles 202). If data preprocessing device 110 receives accident data (e.g., vehicle image 203) only, data preprocessing device 110 may send preprocessed results 213 (e.g., an image area of the accident damaged vehicle body and the corresponding vehicle view information) to accident database 103.

Returning to FIG. 1, model training device 120 may communicate with training database 101 to receive one or more sets of preprocessed training data 111 (e.g., preprocessed results 211 and similarity matrix 212). Model training device 102 may use the received data to train a plurality of deep learning models and select an optimal model (e.g., trained model 115) to generate embedding vectors for past vehicles (e.g., embedding vectors 125). For example, model training device 102 may sample the received data based on similarity matrix 212 and use the sampled data to train the deep learning models such as convolutional neural networks (e.g., VGG), residual neural networks (e.g., ResNet), or both.

In some embodiments, the training phase may be performed online or offline. An online training refers to performing the training phase contemporarily with the loss estimation phase, e.g., learning the models in real-time just prior to estimating the monetary loss to the accident damaged vehicle. Consistent with the present disclosure, an offline training may be used where the training phase is performed separately from the loss estimation phase. The learned models are trained offline, and the selected model (e.g., trained model 115) and embedding vectors of the past vehicles (e.g., embedding vectors 125) are saved and reused for estimating the amount of monetary loss to the accident damaged vehicle.

Model training device 120 may be implemented with hardware specially programmed by software that performs the training process. For example, model training device 120 may include a processor and a non-transitory computer-readable medium. The processor may conduct the training by performing instructions of a training process stored in the computer-readable medium. Model training device 120 may additionally include input and output interfaces to communicate with training database 101, loss estimation device 130, network 106, and/or a user interface (not shown). The user interface may be used for selecting sets of preprocessed training data, adjusting one or more parameters of the training process, selecting or modifying a framework of the deep learning models, and/or manually or semi-automatically providing similarity labels associated with the training data (e.g., preprocessed training data 111).

Figure 5:
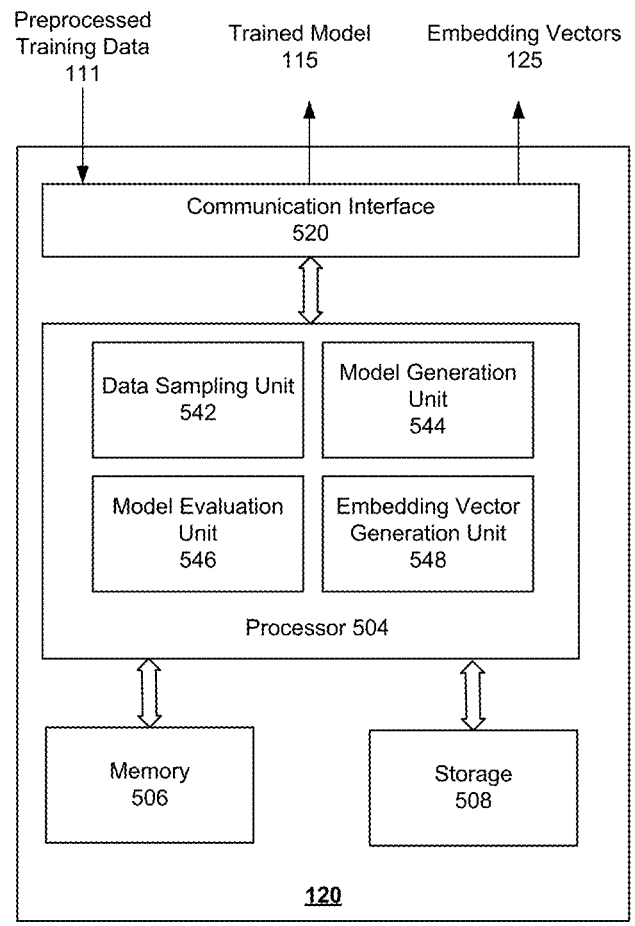
FIG. 5 illustrates a block diagram of an exemplary model training device illustrated in FIG. 1, according to embodiments of the disclosure.

FIG. 5 illustrates a block diagram of an exemplary model training device 120 illustrated in FIG. 1, according to embodiments of the disclosure. In some embodiments, as shown in FIG. 5, model training device 120 may include a communication interface 520, a processor 504, a memory 506, and a storage 508. In some embodiments, model training device 120 may include different modules in a single device, such as an IC chip (implemented as an ASIC or a FPGA), or separate devices with dedicated functions. In some embodiments, one or more components of model training device 120 may be located in a cloud, or alternatively in a single location (such as a mobile device) or distributed locations. Components of model training device 120 may be in an integrated device, or distributed at different locations but communicate with each other through a network (not shown).

Communication interface 520 may receive data from components such as training database 101 via communication cables, a WLAN, a WAN, wireless networks such as radio waves, a cellular network, and/or a local or short-range wireless network (e.g., Bluetooth™), or other communication methods. In some embodiments, communication interface 520 can be an ISDN card, cable modem, satellite modem, or a modem to provide a data communication connection. As another example, communication interface 520 can be a LAN card to provide a data communication connection to a compatible LAN. Wireless links can also be implemented by communication interface 520. In such an implementation, communication interface 520 can send and receive electrical, electromagnetic or optical signals that carry digital data streams representing various types of information via a network.

Consistent with some embodiments, communication interface 520 may receive preprocessed training data 111 (e.g., vehicle body images, similarity correlation matrix, etc.) from training database 101. Communication interface 520 may further provide the received data to memory 506 and/or storage 508 for storage or to processor 504 for processing.

Processor 504 may be a processing device like processor 204 that includes one or more general processing devices, such as a microprocessor, a CPU, a GPU, and the like. More specifically, processor 504 may be a CISC microprocessor, a RISC microprocessor, a VLIW microprocessor, a processor running other instruction sets, or a processor that runs a combination of instruction sets. Processor 504 may also be one or more dedicated processing devices such as ASICs, FPGAs, DSPs, SoCs, and the like.

Processor 504 may be configured as a separate processor module dedicated to performing training and evaluating models and generating embedding vectors of past vehicles. Alternatively, processor 504 may be configured as a shared processor module for performing other functions. Processor 504 may be communicatively coupled to memory 506 and/or storage 508 and configured to execute the computer-executable instructions stored thereon.

Memory 506 and storage 508 may include any appropriate type of mass storage provided to store any type of information that processor 504 may need to operate. Memory 506 and storage 508 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 506 and/or storage 508 may store one or more computer programs that may be executed by processor 504 to perform data process disclosed herein. For example, memory 506 and/or storage 508 may store program(s) that may be executed by processor 504 to sample training data and train deep learning models for generating embedding vectors of past vehicles and accident damaged vehicles. In one example, memory 506 may be a RAM integrated into model training device 120, while storage 508 may be a ROM detachably inserted into a slot provided inside model training device 120.

Memory 506 and/or storage 508 may further store information and data used by processor 504. For instance, memory 506 and/or storage 508 may store various types of data, such as preprocessed training data 111 received from training database 101. Memory 506 and/or storage 508 may also store intermediate data, such as baseline data and supporting data sampled from preprocessed training data 111. Memory 506 and/or storage 508 may further store various deep learning models used by processor 504, such as embedding neural network models (e.g., VGG, ResNet, etc.). Memory 506 and/or storage 508 may also store embedding vectors generated by applying an optimal model selected from the trained models to data of past vehicles (e.g., images of detected vehicle body). The various types of data may be stored permanently, removed periodically, or disregarded immediately after each frame of data is processed.

As shown in FIG. 5, processor 504 includes multiple modules, such as a data sampling unit 542, a model generation unit 544, a model evaluation unit 546, an embedding vector generation unit 548, and the like. These modules (and any corresponding sub-modules or sub-units) can be hardware units (e.g., portions of an integrated circuit) of processor 504 designed for use with other components or software units implemented by processor 504 through executing at least part of a program. The program may be stored on a computer-readable medium, and when executed by processor 504, it may perform one or more functions. Although FIG. 5 shows units 542, 544, 546 and 548 all within one processor 504, it is contemplated that these units may be distributed among multiple processors located near or remotely with each other. According to the present disclosure, the number and type of these modules are not limited to those shown in FIG. 5.

In some embodiments, units 542, 544, 546 and 548 of FIG. 5 may execute computer instructions to sample data, train/evaluate models, and generate embedding vectors of past vehicles. In some embodiments, data sampling unit 542 may receive preprocessed training data of past vehicles (e.g., preprocessed training data 111) from communication interface 520. Data sampling unit 542 may further divide the received preprocessed training data 111 into sub-datasets based on the make and the model of the corresponding vehicle of the preprocessed training data 111. For example, past vehicles of the preprocessed training data 111 within the same sub-dataset may belong to the same make and model (e.g., Toyota Camry, Ford Fusion, Honda Accord, etc.). Each sub-dataset may include vehicle body images of past vehicles (e.g., image areas of bounding boxes 304 and 316), view angle information of each vehicle body image, and a similarity correlation matrix of the past vehicles.

In some embodiments, data sampling unit 542 may sample data for each sub-dataset. For example, data sampling unit 542 may apply a random sampling method to the preprocessed training data 111 in each sub-dataset based on a distribution of the amount of monetary losses to the past vehicles (e.g., total repair cost) in the sub-dataset. The amount of monetary losses to the sampled vehicles may have a similar distribution as that of all past vehicles in the sub-dataset. The sampled past vehicles are used as baseline cases in the model training. It is contemplated that the sampling method is not limited to the random sampling method, any suitable sampling method may be used for selecting representative cases of past vehicles as baseline cases for further model training.

In some embodiments, data sampling unit 542 may further review the amount of monetary losses to the baseline cases and remove redundant baseline cases (e.g., baseline cases having similar amount of monetary losses to others) based on the similarity correlation matrix. For example, if a value of the matrix label of two baseline cases is equal or close to 1 (such as 1, 0.99, 0.95, 0.90, 0.85, any range bounded by the lower end by any of these values, or in any range defined by any two of these values), it indicates that the two baseline cases have similar amount of monetary losses. As a result, data sampling unit 542 may remove the baseline cases having amount of monetary losses similar to others to increase the variance of the similarity of the baseline cases. In some embodiments, for each baseline case, data sampling unit 542 may select several (e.g., 2, 3, 4 or 5) supporting cases from the non-baseline cases in the sub-dataset based on the similarity correlation matrix. For example, data sampling unit 542 may select cases having amount of monetary losses similar to the baseline case in the similarity matrix (e.g., a value of the matrix label between the case and the baseline case is equal or close to 1) as the supporting cases associated with the baseline case.

In some embodiments, model generation unit 544 may use the selected baseline cases and the associated supporting cases to train models. For example, model generation unit 544 may divide the training data into several batches. Each batch of the training data includes one or more baseline cases. Each baseline case is associated with one or more supporting cases. Within each batch of the training dataset, the vehicles in the images of the baseline case and the supporting cases have a same view (e.g., front view). Model generation unit 544 may use one batch of the training data to train the deep learning model (e.g., VGG, ResNet, etc.) at each training cycle. Different batches of the training data may be used to train the same model. In some embodiments, model generation unit 544 may train the deep learning model to convert an image of vehicle body into a set of feature values (e.g., an embedding vector) to represent the input image of the vehicle body. For example, the trained model may convert images of two vehicles having similar amount of monetary losses into two embedding vectors having the same or substantially the same feature values.

In some embodiments, the trained model may further include a fully connected layer. For example, besides image information of the past vehicles, loss category information for the individual part of each vehicle may also be included in the training dataset. The fully connected layer in the trained model may be able to utilize loss category information of the vehicle part to improve the model performance.

Figure 6:
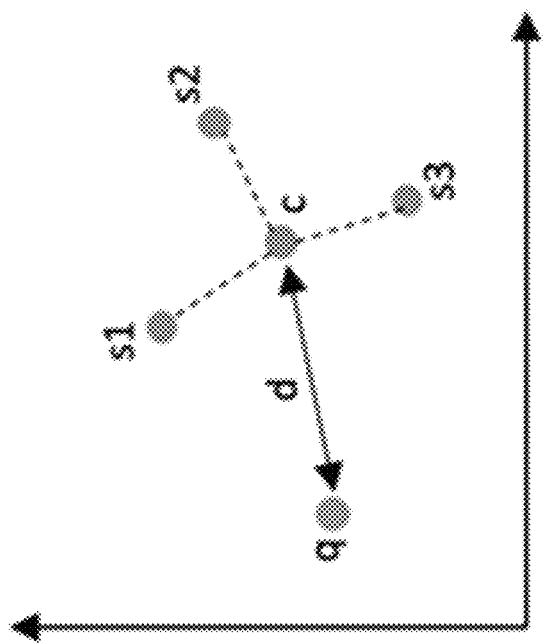
FIG. 6 illustrates an exemplary diagram of a query case, supporting cases, and the corresponding center of the supporting cases, according to embodiments of the disclosure.

In some embodiments, model generation unit 544 may use a loss function to determine a model error according to equation (3):

$$L = \frac{1}{N_q^2} \sum_{i=1}^{N_q} \frac{\exp(-d(f(q_i), c_i))}{\sum_{j=1}^{N_q} \exp(-d(f(q_i), c_j))}, \quad (3)$$

where L is the model error, $N_q$ is the number of query cases (e.g., baseline cases), $q_i$ is the ith query case, $1<=i<=N_q$, $f(q_i)$, is a model output of $q_i$ (e.g., an embedding vector of the ith query case), $d(f(q_i), c_i)$ is a Euclidean distance between model output $f(q_i)$ and a center $c_i$, $c_i$ is the center of supporting cases associated with query case $q_i$, $c_j$ is a center of target embedding vectors of the supporting cases associated with the jth query case $q_j$, $1<=j<=N_q$, $j\neq i$, and $d(f(q_i), c_j)$ is a Euclidean distance between model output $f(q_i)$ and center $c_j$. In some embodiments, $c_i$ can be determined according to equation (4):

$$c_i = \frac{1}{N_s} \sum_{k=1}^{N_s} f(s_{ik}), \quad (4)$$

where $N_s$ is the number of supporting cases associated with query case $q_i$, $s_{ik}$ is the kth supporting case associated with query case $q_i$, $1<=k<=N_s$, $f(s_{ik})$ is a model output of case $s_{ik}$ (e.g., an embedding vector of the supporting case), FIG. 6 illustrates an exemplary diagram of a query case, supporting cases, and the corresponding center of the supporting cases, according to embodiments of the disclosure. For example, as shown in FIG. 6, a query case q has three supporting cases $s_1$, $s_2$, and $s_3$. Center c is the center of supporting cases $s_1$, $s_2$, and $s_3$ that can be determined according to equation (4). Euclidean distance d is determined based on query case q and center c. In some embodiments, when the Euclidean distance between each pair of the query case and the center of the associated supporting cases is small and the Euclidean distances from each query case to any center of supporting cases associated with other query cases is large, the loss function may achieve a minimum value according to equation (3).

In some embodiments, model generation unit 544 may train several models based on the training data. For example, model generation unit 544 may train VGG models and ResNet models. Each trained model may have different parameters (e.g., layers, weights, etc.) compared to those with other trained models. In some embodiments, model evaluation unit 546 may evaluate the trained models (or intermediate models) and select an optimal model. For example, model evaluation unit 546 may apply a trained model to a validation case (e.g., preprocessed vehicle images of a past vehicle) and generate an embedding vector for each image of the validation case. In some embodiments, if the validation case includes two or more images, each of which has a different vehicle view, the trained model may output two or more embedding vectors. For example, the validation case may include two vehicle images. Embedding vector generation unit 548 may convert each image into an embedding vector (e.g., a set of feature values) by applying the trained model. Embedding vector generation unit 548 may further convert images of the past vehicles (e.g., those having the same view angle of images as that in the validation case) into embedding vectors using the trained model. Model generation unit 544 may also determine k past vehicles that have the most similar amount of monetary losses to the vehicle in the validation case, and k is a predetermined natural number. For example, model generation unit 544 may calculate a Euclidean distance from the validation embedding vector to each embedding vector of the past vehicles to determine top k past vehicles having amount of monetary losses most similar to the validation case.

In some embodiments, an average amount of monetary losses to the top k past vehicles can be calculated for evaluating the performance of each trained model. Model evaluation unit 546 may calculate a difference between the average amount of monetary losses to the top k past vehicles and the amount of monetary loss to the validation case. The difference may be used as a criterion to evaluate the performance of each trained model. For example, model evaluation unit 546 may select a trained model that achieves the smallest difference among the trained models (or intermediate models) as the optimal model.

In some embodiments, model evaluation unit 546 may calculate a relative similarity as another criterion to select the optimal model based on the similarity correlation matrix. Consistent with the present disclosure, the similarity correlation matrix includes similarity labels of each pair of the past vehicles. For example, model evaluation unit 546 may use a validation case Q to evaluate a trained model T. The top k past vehicles, determined by trained model T, that having amount of monetary losses most similar to validation case Q is $[C'_1, C'_i, \ldots, C'_k]$, where $1<=i<=k$. The ground truth of the top k past vehicles for validation case Q is $[C_1, C_i, \ldots, C_k]$. Relative similarity $r_s$ of trained model T may be calculated according to equation (5):

$$r_s = \frac{\sum_{i=1}^{k} S[Q, C'_i]}{\sum_{i=1}^{k} S[Q, C_i]}, \quad (5)$$

where $S[Q, C'_i]$ is a similarity label of validation case Q and past vehicle $C'_i$ in the similarity correlation matrix, and $S[Q, C_i]$ is a similarity label of validation case Q and ground truth past vehicle $C_i$ in the similarity correlation matrix.

In some embodiments, model generation unit 544 may select the optimal model based on two criteria: (1) the difference between the amount of monetary loss to validation case Q and the average amount of monetary losses to the top k past vehicles; and (2) relative similarity $r_s$ calculated based on the determined top k past vehicles based on the trained model and the ground truth of the top k past vehicles of validation case Q. For example, if a trained model can achieve the smallest value of criterion (1) (e.g., the difference regarding the amount of monetary loss) and the largest value of criterion (2) (e.g., relative similarity) comparing with those of the other trained models, model generation unit 544 may select the trained model as the optimal model for generating embedding vectors for the past vehicles and the accident damaged vehicles.

In some embodiments, embedding vector generation unit 548 may apply the optimal model to the images of the past vehicles and generate an embedding vector (e.g., a set of feature values) to represent each preprocessed image. For example, data preprocessing device 110 may generate eight preprocessed images for a past vehicle and store the images in training database 101. The past vehicle in each of the eight processed images may be in a different view (e.g., front view, rear view, left view, right view, left front view, left rear view, right front view, or right rear view). Embedding vector generation unit 548 may apply the optimal model to the eight processed images and generate eight corresponding embedding vectors. Communication interface 520 may send the generated embedding vectors (e.g., embedding vectors 125) and the optimal model (e.g., trained model 115) to training database 101. Communication interface 520 may also send the generated embedding vectors (e.g., embedding vectors 125) and the optimal model (e.g., trained model 115) to loss estimation device 130 for estimating a monetary loss to the accident damaged vehicle. In some embodiments, vehicle and loss related information (e.g., Case No., Make, Total Repair Cost, whether a Total Loss, etc. in FIG. 4) may be associated with each embedding vector of the corresponding past vehicle in training database 101.

Returning to FIG. 1, loss estimation device 130 may communicate with accident database 103 to receive accident data (e.g., preprocessed accident data 121). The accident data may include processed images of the accident damaged vehicle, impact location information of the accident damaged vehicle, and other information related to the accident damaged vehicle (e.g., make, model, year, etc.). For example, loss estimation device 130 may receive at least one processed image, and each image includes a body of the accident damaged vehicle. The view angle of the vehicle in each image may be different (e.g., front view, left front view, right view, rear view, etc.). In some embodiments, loss estimation device 130 may receive eight processed images of the accident damaged vehicle, and each image includes a view angle of the accident damaged vehicle that is different from the other seven images. The impact location information of the accident damaged vehicle may include a direction of the external force that got into contact with the accident damaged vehicle (e.g., front, rear, left, right, left front, left rear, right front, right rear, etc.).

In some embodiments, loss estimation device 130 may use trained model 115 (e.g., the optimal model) and embedding vectors 125 received from model training device 120 to perform one or more of the following: (1) applying trained model 115 to the preprocessed images of the accident damaged vehicle to generate a set of embedding vectors to represent the accident damaged vehicle, (2) comparing the embedding vectors of the accident damaged vehicle to each of embedding vectors 125, (3) identifying top k most similar past vehicles to the accident damaged vehicle, (4) determining a confidence level of the top k past vehicles, (5) determining a total amount of monetary loss to the accident damaged vehicle, (6) estimating each replacement part cost and the corresponding labor cost for the accident damaged vehicle, and (7) determining whether the accident damaged vehicle suffered a total loss.

Figure 7:
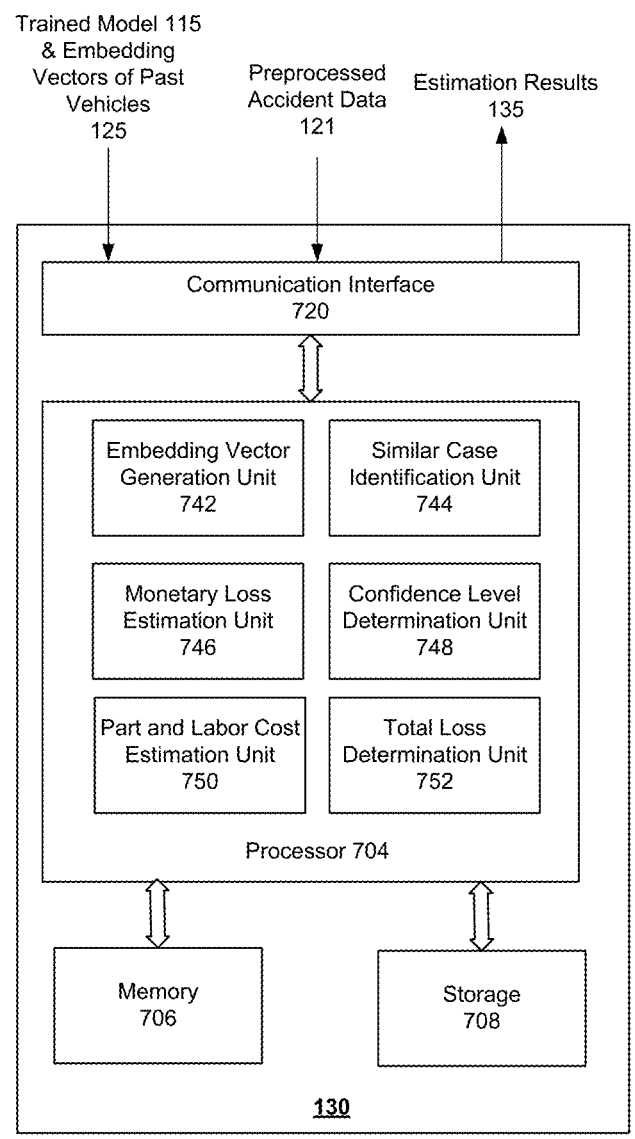
FIG. 7 illustrates a block diagram of an exemplary loss estimation device illustrated in FIG. 1, according to embodiments of the disclosure.

FIG. 7 illustrates a block diagram of an exemplary loss estimation device 130 illustrated in FIG. 1, according to embodiments of the disclosure. Consistent with the present disclosure, loss estimation device 130 may receive preprocessed accident data 121 from accident database 103, and trained models 115 and embedding vectors 125 from model training device 120. The reception of these two different data streams may be simultaneous or sequential. Loss estimation device 130 may generate embedding vectors for the accident damaged vehicle using trained model 115 based on preprocessed accident data 121. Consistent with the present disclosure, loss estimation device 130 may generate estimation results 135 including one or more of the following: the identified top k most similar past vehicles, the determined confidence level of the top k most similar past vehicles, the estimated total amount of monetary loss to the accident damaged vehicle, the estimated cost of replacement part and the corresponding labor cost, and whether the accident damaged vehicle suffered a total loss. The estimation results 135 may be output to the outside of loss estimation device 130 for further processing.

In some embodiments, as shown in FIG. 7, loss estimation device 130 may include a communication interface 720, a processor 704, a memory 706, and a storage 708. In some embodiments, loss estimation device 130 may include different modules in a single device, such as an IC chip (implemented as an ASIC or a FPGA), or separate devices with dedicated functions. In some embodiments, one or more components of loss estimation device 130 may be located in a cloud, or alternatively in a single location (such as a mobile device) or distributed locations. Components of loss estimation device 130 may be in an integrated device, or distributed at different locations but communicate with each other through a network (not shown).

Communication interface 720 may receive data from components such as accident database 103 and model training device 120 via communication cables, a WLAN, a WAN, wireless networks such as radio waves, a cellular network, and/or a local or short-range wireless network (e.g., Bluetooth™), or other communication methods. In some embodiments, communication interface 720 can be an ISDN card, cable modem, satellite modem, or a modem to provide a data communication connection. As another example, communication interface 720 can be a LAN card to provide a data communication connection to a compatible LAN. Wireless links can also be implemented by communication interface 720. In such an implementation, communication interface 720 can send and receive electrical, electromagnetic or optical signals that carry digital data streams representing various types of information via a network. Communication interface 720 may further provide the received data to memory 706/storage 708 for storage or to processor 704 for processing.

Processor 704 may be a processing device that includes one or more general processing devices, such as a microprocessor, a CPU, a GPU, and the like. More specifically, processor 704 may be a CISC microprocessor, a RISC microprocessor, a VLIW microprocessor, a processor running other instruction sets, or a processor that runs a combination of instruction sets. Processor 704 may also be one or more dedicated processing devices such as ASICs, FPGAs, DSPs, SoCs, and the like.

Processor 704 may be configured as a separate processor module dedicated to processing preprocessed accident data 121 from accident database 103. Alternatively, processor 704 may be configured as a shared processor module for performing other functions. Processor 704 may be communicatively coupled to memory 706 and/or storage 708 and configured to execute the computer-executable instructions stored thereon.

Memory 706 and storage 708 may include any appropriate type of mass storage provided to store any type of information that processor 704 may need to operate. Memory 706 and storage 708 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 706 and/or storage 708 may store one or more computer programs that may be executed by processor 704 to perform monetary loss estimation disclosed herein. For example, memory 706 and/or storage 708 may store program(s) that may be executed by processor 704 to estimate the amount of monetary loss to the accident damaged vehicle. In one example, memory 706 may be a RAM integrated into loss estimation device 130, while storage 708 may be a ROM detachably inserted into a slot provided inside loss estimation device 130.

Memory 706 and/or storage 708 may further store information and data used by processor 704. For instance, memory 706 and/or storage 708 may store various types of data, such as image data received from accident database 103. Memory 706 and/or storage 708 may also store intermediate data, such as the embedding vectors of the accident damaged vehicle, and the top k similar past vehicles for the accident damaged vehicle. Memory 706 and/or storage 708 may further store the optimal model (e.g., trained model 115) used by processor 704 to generate the embedding vectors of the accident damaged vehicle. The various types of data may be stored permanently, removed periodically, or disregarded immediately after each frame of data is processed.

As shown in FIG. 7, processor 704 includes multiple modules, such as an embedding vector generation unit 742, a similar case identification unit 744, a monetary loss estimation unit 746, a confidence level determination unit 748, a part and labor cost estimation unit 750, a total loss determination unit 752, and the like. These modules (and any corresponding sub-modules or sub-units) can be hardware units (e.g., portions of an integrated circuit) of processor 704 designed for use with other components or software units implemented by processor 704 through executing at least part of a program. The program may be stored on a computer-readable medium, and when executed by processor 704, it may perform one or more functions. Although FIG. 7 shows units 742, 744, 746, 748, 750, and 752 all within one processor 704, it is contemplated that these units may be distributed among multiple processors located near or remotely with each other. According to the present disclosure, the number and type of these modules are not limited to those shown in FIG. 7.

In some embodiments, units 742, 744, 746, 748, 750, and 752 of FIG. 7 may execute computer instructions to estimate a monetary loss to the accident damaged vehicle. In some embodiments, embedding vector generation unit 742 may apply a trained model (e.g., optimal model) to each preprocessed image of the accident damaged vehicle to generate an embedding vector. In some embodiments, because embedding vector generation unit 742 and embedding vector generation unit 548 perform the same function, the two units can be the same unit or implemented by the same module.

In some embodiments, similar case identification unit 744 may identify k vehicles in historical accident cases that have embedding vectors most similar to those of the accident damaged vehicle. Consistent with the present disclosure, each accident damaged vehicle may be represented by eight embedding vectors when there are eight unique view angles, and each embedding vector may represent the accident damaged vehicle from a unique view angle. For example, the preprocessed data of the accident damaged vehicle may include three images of the accident damaged vehicle and each image has a different view angle of the accident damaged vehicle (e.g., front view, left front view, and right front view). Embedding vector generation unit 742 may generate an embedding vector (e.g., a set of feature values) for each of the three preprocessed images of the accident damaged vehicle (e.g., e1, e2, and e3). Similar case identification unit 744 may create a subset of embedding vectors of the past vehicles from embedding vectors 125. The past vehicles in the subset may have the same make and model as the accident damaged vehicle. Each past vehicle in the subset may include the same number of embedding vectors as that of the accident damaged vehicle. For example, if embedding vector generation unit 742 generates three embedding vectors for the accident damaged vehicle, similar case identification unit 744 may select three embedding vectors for each past vehicle with the same view angles as the embedding vectors of the accident damaged vehicle. It is understood that, with the teaching of the present disclosure, an ordinary person of skill in the art may design system 100 to be able to categorize the processed vehicle into other number of view angles, such as four (no oblique views), twelve (with views from an upper angle), sixteen (with views from both an upper angle and a lower angle), etc.

In some embodiments, similar case identification unit 744 may calculate a distance (e.g., Euclidean distance) between an embedding vector of the accident damaged vehicle and the corresponding embedding vector of a past vehicle in the subset. The two vehicles have the same view angle (e.g., front view) in their respective images. In some embodiments, a reciprocal of the distance is used as a similarity score of the two embedding vectors in the corresponding view angle. Similar case identification unit 744 may repeat this calculation in order to obtain similarity scores between different pairs of embedding vectors from different view angles of the two vehicles.

In some embodiments, similar case identification unit 744 may calculate a weighted average of the similarity scores between the two batches of embedding vectors. For example, impact location information (e.g., the collision direction information) can be used as weights to apply to the similarity scores. In some embodiments, a larger weight may be applied to the similarity score that is associated with a view angle which is consistent with the collision direction. For example, if the collision comes from the front of the accident damaged vehicle, the parts in the front of the accident damaged vehicle may be seriously damaged. The similarity score calculated based on the embedding vectors associated with the front view thereby may receive a larger weight. In some embodiments, the weighted average of the similarity scores is used to measure a similarity between the total monetary loss to the accident damaged vehicle and that of the corresponding past vehicle.

In some embodiments, similar case identification unit 744 may select k past vehicles whose amount of monetary losses are most similar to that of the accident damaged vehicle, where k is a natural number. In some embodiments, k may be predetermined by a user or preset in system 100. According to the present disclosure, k may be 1, 2, 3, 4, 5, 6, 7, 8, 9, 10, or any other number predetermined by the user or preset in system 100. For example, similar case identification unit 744 may use a fast search algorithm, e.g., locality-sensitive hashing (LSH), to find a group of candidate past vehicles that have embedding vectors similar to (e.g., those having same or substantially same feature values as) that of the accident damaged vehicle. Similar case identification unit 744 may further apply a more accurate search algorithm (e.g., nearest neighbor algorithm) to the group of candidate past vehicles to find k past vehicles that may have embedding vectors most similar to that of the accident damaged vehicle based on the calculated similarities (e.g., the weighted average of the similarity scores) between the embedding vectors of the accident damaged vehicle and each past vehicle.

In some embodiments, monetary loss estimation unit 746 may estimate a total amount of monetary loss to the accident damaged vehicle based on (a) the weighted similarity between the accident damaged vehicle and the selected k past vehicles and (b) the total amount of monetary loss to each of the selected k past vehicles. For example, three past vehicles are identified as each having an amount of monetary loss similar to the accident damaged vehicle. Thus, k is 3 in this example. The similarity weights between the accident damaged vehicle and each of the selected past vehicle are w1, w2, and w3, respectively. The total amount of monetary loss to each of the three selected past vehicles is v1, v2, and v3, respectively. The total amount of monetary loss to the accident damaged vehicle V can be determined as a weighted average of the total amount of monetary losses to the selected k past vehicles according to equation (6):

$$V = \frac{(w1 \cdot v1 + w2 \cdot v2 + w3 \cdot v3)}{(w1 + w2 + w3)} \qquad (6)$$

In some embodiments, confidence level determination unit 748 may evaluate the similarities between the accident damaged vehicle and each of the selected k past vehicles. For example, the confidence level may be determined based on a variance among the similarity weights. A large variance indicates that the k past vehicles do not have a similar amount of monetary loss among each other, which may result in a small value in the confidence level. In some embodiments, if the confidence level is below a predetermined threshold, loss estimation device 130 may send a message to request for human determination of the amount of monetary loss to the accident damaged vehicle. If the confidence level is equal to or above the predetermined threshold, loss estimation device 130 may estimate the amount of monetary loss to the accident damaged vehicle.

In some embodiments, part and labor cost estimation unit 750 may estimate cost for replacing a vehicle part and the corresponding labor cost for such replacement. For example, part and labor cost estimation unit 750 may estimate cost of a replacement part (e.g., front bumper) for the accident damaged vehicle based on (a) the weighted similarity between the accident damaged vehicle and the selected k past vehicles and (b) the cost of the replacement part of the selected k past vehicles. Consistent with some embodiments, the cost information for the replacement part may be associated with the embedding vectors of each past vehicle and saved in training database 101. Part and labor cost estimation unit 750 may calculate a weighted average of the cost of the replacement part of the selected k past vehicles as the estimated cost of the replacement part for the accident damaged vehicle. In some embodiments, the corresponding labor cost of repairing the damaged part or replacing the damaged part for the accident damaged vehicle can be estimated using a similar method (e.g., weighted average) as that for replacing a vehicle part.

In some embodiments, total loss determination unit 752 may determine whether the accident damaged vehicle suffered a total loss. For example, total loss determination unit 752 may calculate a probability that the accident damaged vehicle suffered a total loss based on (a) the weighted similarity between the accident damaged vehicle and the selected k past vehicles and (b) total loss label for the selected k past vehicles. If a vehicle in the list of the selected k past vehicles suffered a total loss, the total loss label for that vehicle is set to 1; otherwise, the total loss label for that vehicle is set to 0. Consistent with some embodiments, the total loss information for each past vehicle may be associated with the embedding vector of the past vehicle and saved in training database 101. Total loss determination unit 752 may calculate a weighted average of the total loss label of the selected k past vehicles, and round the weighted average to 0 or 1. If the rounded result equals 0, the accident damaged vehicle is determined to not have suffered a total loss; otherwise, the accident damaged vehicle is determined to have suffered a total loss.

Although certain parts with the same name are referred to with different reference numbers in FIGS. 1-7, it is understood that, in some embodiments according to the present disclosure, they may be implemented by the same component of system 100. For example, processor 204, processor 504, and processor 704 may be implemented by the same processor component. Likewise, memory 206, memory 506, and memory 706 may also be implemented by the same memory component. So are storage 208, storage 508, and storage 708, as well as communication interface 220, communication interface 520, and communication interface 720. Thus, when the parts with the same name are implemented by a single component of system 100, the system complexity may be significantly reduced. On the other hand, implementing such parts with the same name with more than one component of system 100 may increase the processing speed of certain functions or storage capability described herein.

Figure 8:
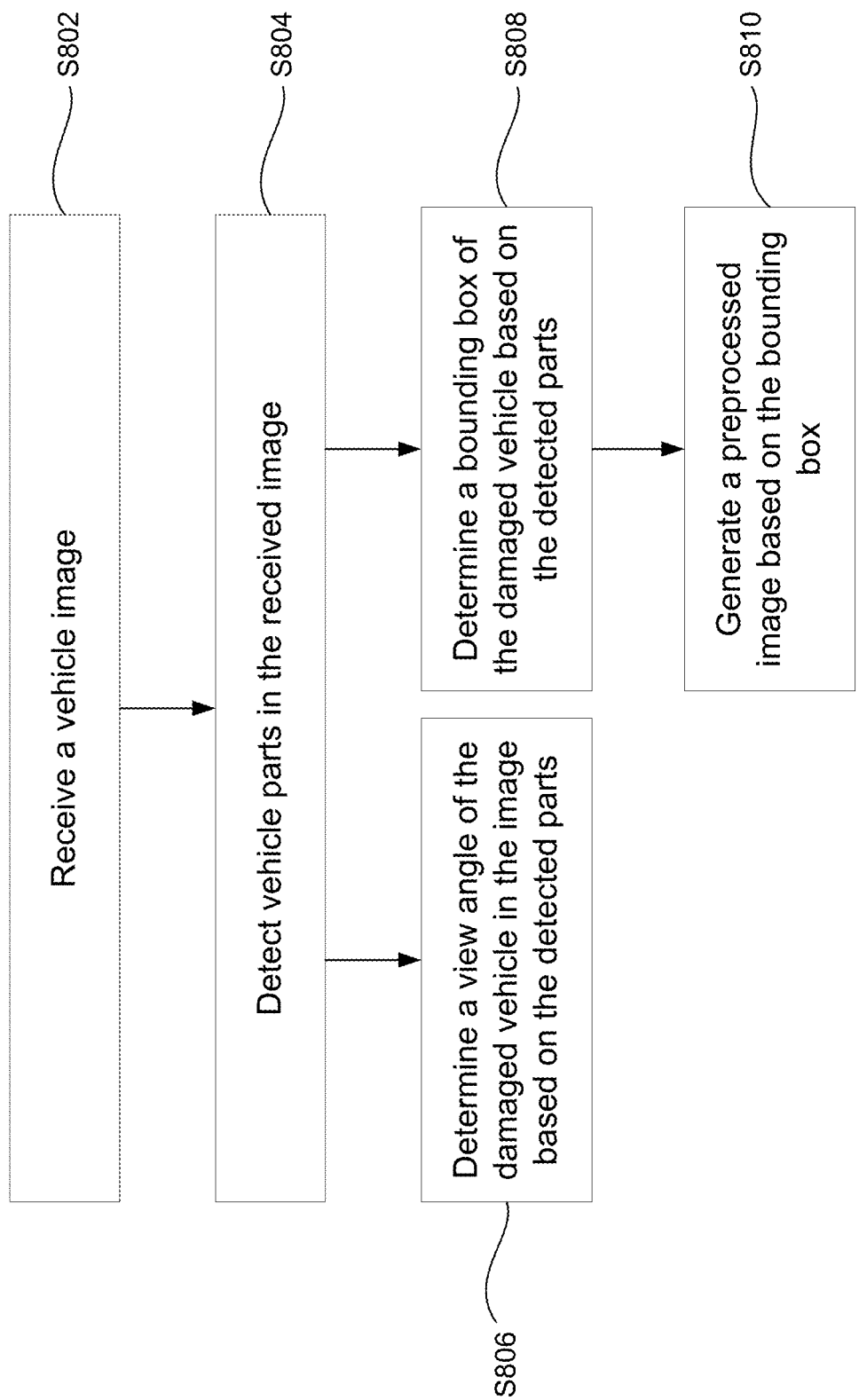
FIG. 8 is a flowchart of an exemplary method for pre-processing vehicle images for training and loss estimation, according to embodiments of the disclosure.

FIG. 8 is a flowchart of an exemplary method 800 for preprocessing vehicle images for training and loss estimation, according to embodiments of the disclosure. Method 800 may be performed by data preprocessing device 110 and processor 204 shown in FIG. 2 (or a separate processor not shown). However, method 800 is not limited to that exemplary embodiment and may be combined with other methods and/or devices described herein. Method 800 may include steps S802, S804, S806, S808, and S810 as described below. It is to be appreciated that some of the steps may be optional to perform the disclosure provided herein. Further, some of the steps may be performed simultaneously, or in a different order than shown in FIG. 8.

In step S802, data preprocessing device 110 may communicate with a database (e.g., training database 101, accident database 103, etc.) to receive a vehicle image. The vehicle may be a past vehicle (e.g., past vehicle with a known amount of monetary loss from a historical accident) or an accident damaged vehicle with an unknown amount of monetary loss. In some embodiments, the image may include at least one vehicle (e.g., the past vehicle or the accident damaged vehicle) which may include a damage (e.g., vehicle in FIG. 3D) or not (e.g., vehicle in FIG. 3A) from the camera view.

In step S804, data preprocessing device 110 may detect some or all of vehicle parts (e.g., front bumper, front hood, etc.) in the received image using a pre-trained deep learning network model (e.g., Single-Shot Detector, Faster-RCNN, etc.). The detection may be automatic or pursuant to an instruction from outside the device, such as from the operator of the system. Consistent with some embodiments, if an image area of a detected vehicle part is of a smaller size as compared to the dimensions of the received image, data preprocessing device 110 may not use the detected part for further processing (e.g., vehicle view determination, vehicle body determination, etc.). If the centroid of a detected vehicle part is close to one of the boundaries of the received image (e.g., less than one tenth of any dimension of the received image), data preprocessing device 110 may not use the detected part for further processing (e.g., vehicle view determination, vehicle body determination, etc.). If data preprocessing device 110 detects two identical vehicle parts (e.g., two front bumpers) in the received image, it suggests that the received image may include at least two vehicles, and therefore data preprocessing device 110 may discard the received image.

In step S806, data preprocessing device 110 may determine a view angle of the damaged vehicle in the received image based on the detected vehicle parts. Consistent with the present disclosure, the damaged vehicle may be in one of the following view angles: front view, rear view, left view, right view, left front view, left rear view, right front view, or right rear view. In some embodiments, data preprocessing device 110 may use spatial information of the detected vehicle parts to determine the view angle of the damaged vehicle in the received image. For example, if only two vehicle parts (e.g., a front bumper and a left front door) are detected in the received images, data preprocessing device 110 may determine that the damaged vehicle is in a left front view in the received image based on the spatial information of the two detected vehicle parts.

In step S808, data preprocessing device 110 may determine a bounding box of the damaged vehicle in the received image based on the detected vehicle parts. Consistent with the present disclosure, the bounding box is an imaginary rectangle that are around the damaged vehicle (e.g., bounding box 304 in FIG. 3C or bounding box 316 in FIG. 3F). In some embodiments, data preprocessing device 110 may combine bounding boxes of the detected vehicle parts to determine coordinates and dimensions of the bounding box of the damaged vehicle in the received image. For example, as shown in FIG. 3C, data preprocessing device 110 may combine bounding boxes 301, 303, 305 and 307 to create bounding box 304 to represent vehicle 310 within the image.

In step S810, data preprocessing device 110 may generate a preprocessed image based on the bounding box of the damaged vehicle. Consistent with some embodiments, data preprocessing device 110 may use an image area of the bounding box of the damaged vehicle to generate the preprocessed image that includes only one vehicle (e.g., the damaged vehicle). In some embodiments, data preprocessing device 110 may store preprocessed data including the preprocessed image and the view angle information of the damaged vehicle within the preprocessed image in the database (e.g., training database 101, accident database 103, etc.).

Figure 9:
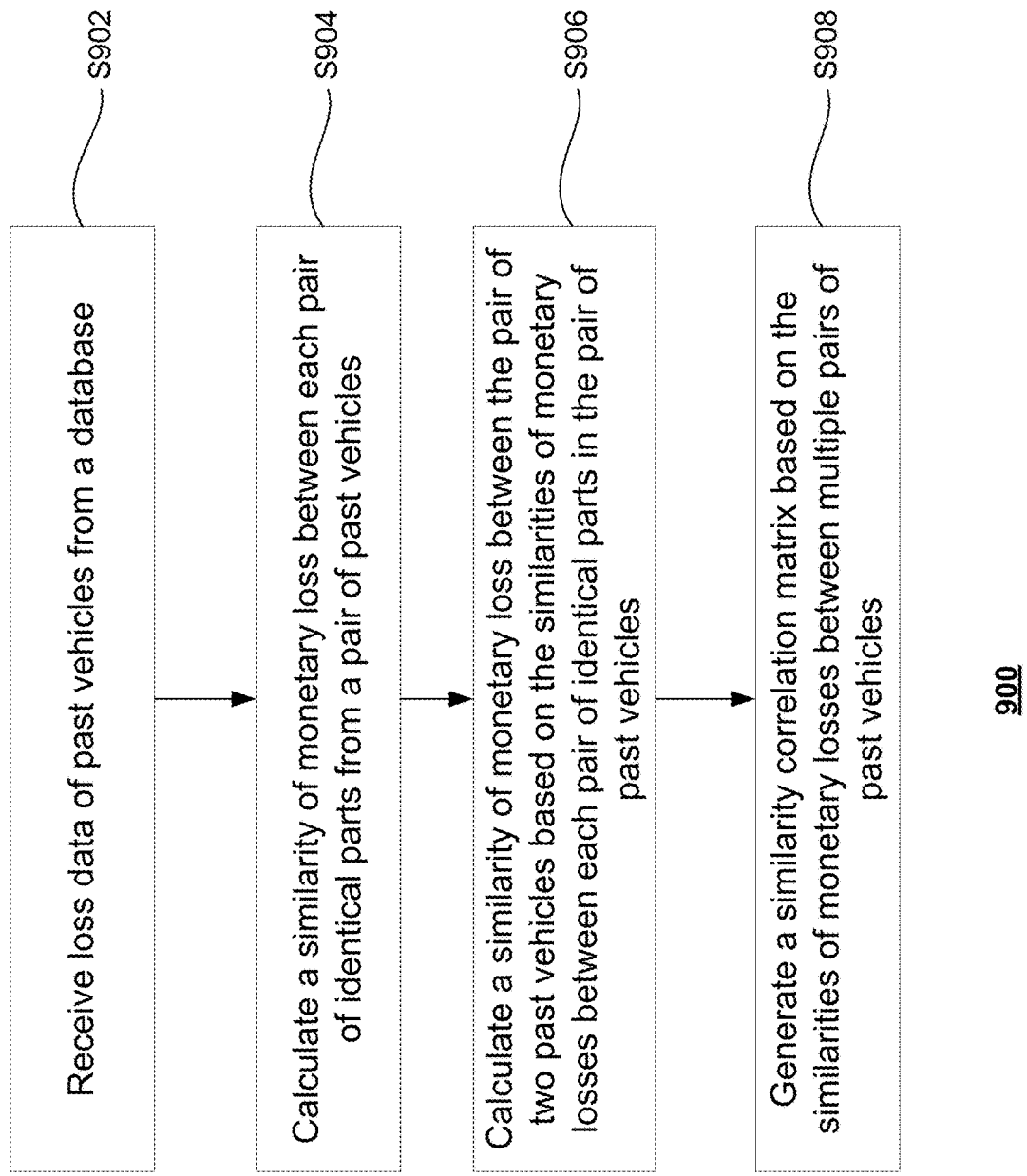
FIG. 9 is a flowchart of an exemplary method for generating a similarity correlation matrix, according to embodiments of the disclosure.

FIG. 9 is a flowchart of an exemplary method 900 for generating a similarity correlation matrix, according to embodiments of the disclosure. Method 900 may be performed by data preprocessing device 110 and particularly processor 204 shown in FIG. 2 (or a separate processor not shown). However, method 900 is not limited to that exemplary embodiment and may be combined with other methods and/or devices described herein. Method 900 may include steps S902, S904, S906, and S908 as described below. It is to be appreciated that some of the steps may be optional to perform the disclosure provided herein. Further, some of the steps may be performed simultaneously, or in a different order than shown in FIG. 9.

In step S902, data preprocessing device 110 may communicate with a database (e.g., training database 101) to receive loss data of past vehicles. Consistent with some embodiments, the loss data associated with each past vehicle may include the past vehicle's manufacture information (e.g., make, model, year, and the like) and loss and/or repair information (e.g., name of damage part, cost of replacement part, part category, labor cost of repairing the damaged parts (including total labor cost, labor hours, labor cost per hour), total repair cost for the damaged parts, cash value of the past vehicle, and whether the past vehicle suffered a total loss).

In step S904, data preprocessing device 110 may calculate a similarity of monetary losses between each pair of identical parts from two past vehicles (also referred to as a pair of past vehicles herein). The calculation may be automatic or pursuant to an instruction from outside the device, such as from the operator of the system. The two past vehicles may have similar manufacture information (e.g., make, model, etc.). The two past vehicles may be manufactured in the same year. Consistent with some embodiments, the similarity of monetary losses between each pair of the identical parts can be calculated according to equation (1). If the two identical parts are not damaged, the similarity of monetary losses between the two identical parts equals 1.

In step S906, data preprocessing device 110 may calculate a similarity of monetary loss between the pair of two past vehicles based on the similarities of monetary losses between each pair of identical parts in the pair of two past vehicles. Consistent with some embodiments, the similarity of monetary losses between each pair of two past vehicles can be calculated by data preprocessing device 110 according to equation (2). In step S908, data preprocessing device 110 may generate a similarity correlation matrix based on the similarities of monetary losses between multiple pairs of past vehicles. Each similarity parameter (or similarity label) in the similarity correlation matrix corresponds to the similarity of monetary losses between one pair of past vehicles.

Figure 10:
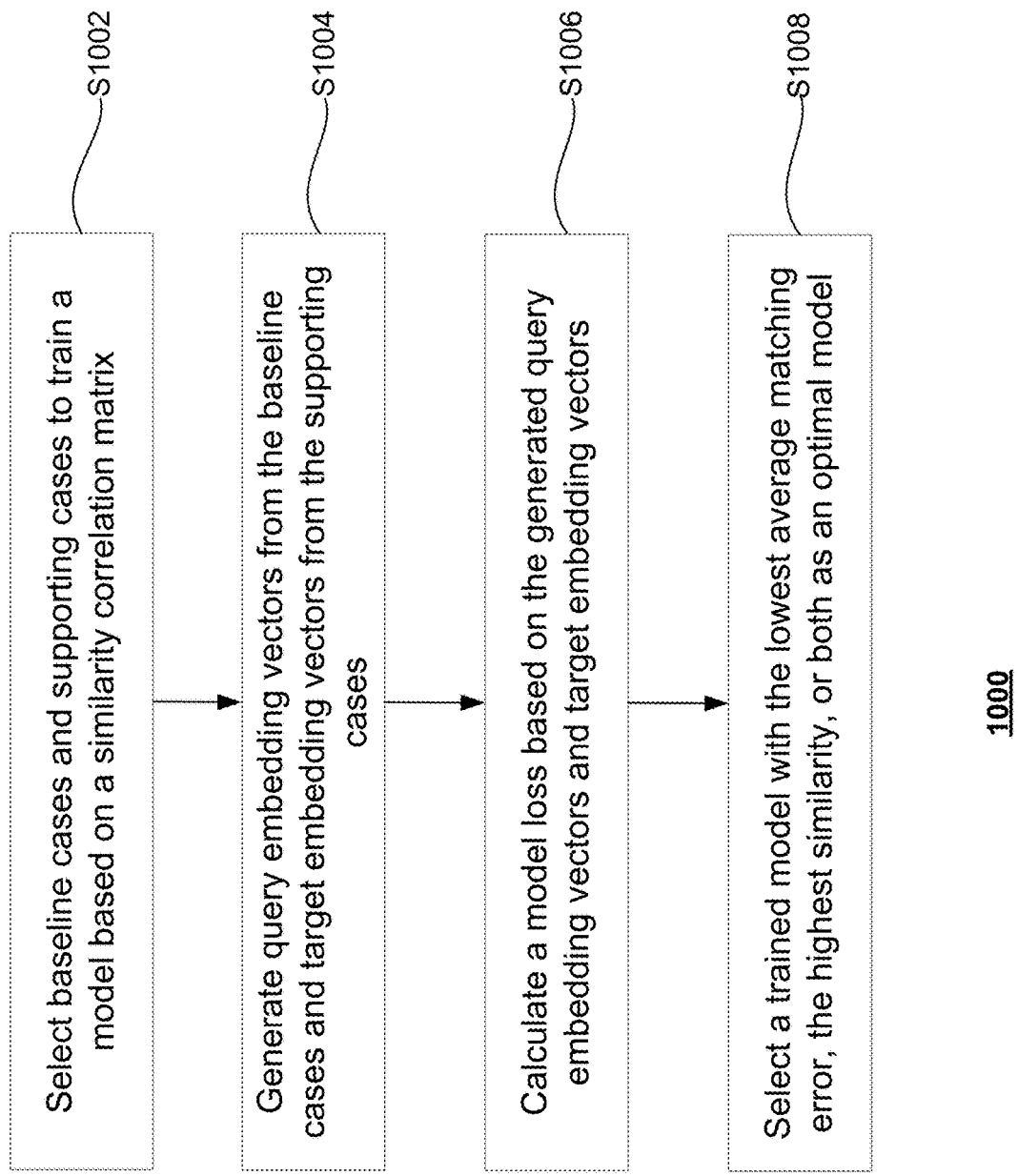
FIG. 10 is a flowchart of an exemplary method for model training and generating embedding vectors for past vehicles, according to embodiments of the disclosure.

FIG. 10 is a flowchart of an exemplary method 1000 for model training and generating embedding vectors for past vehicles, according to embodiments of the disclosure. Method 1000 may be performed by model training device 120 and processor 504 shown in FIG. 5 (or a separate processor not shown). However, method 1000 is not limited to that exemplary embodiment and may be combined with other methods and/or devices described herein. Method 1000 may include steps S1002, S1004, S1006, and S1008 as described below. It is to be appreciated that some of the steps may be optional to perform the disclosure provided herein. Further, some of the steps may be performed simultaneously, or in a different order than shown in FIG. 10.

In step S1002, model training device 120 may communicate with a database (e.g., training database 101) to select baseline cases and supporting cases to train a model based on a similarity correlation matrix generated using method 900. In some embodiments, model training device 120 may randomly select a set of baseline cases containing past vehicles whose amount of monetary losses represent the space of the amount of monetary loss to the entire set of the past vehicles. For example, model training device 120 may cluster the past vehicles based on the amount of monetary losses to the past vehicles (e.g., by k-means clustering) and select an amount of monetary loss that is the closest to each cluster center. The past vehicles associated with those selected amount of monetary losses are selected as baseline cases. Model training device 120 may further filter, based on the similarity correlation matrix, some baseline cases whose amount of monetary losses are similar to other baseline cases. For example, model training device 120 may evaluate each similarity label of each pair of baseline cases. If the similarity label of any pair of baseline cases is higher than or equal to a first predetermined threshold, one of the two baseline cases may be filtered out, thus not used. For the remaining baseline cases, the similarity labels for each pair of the baseline cases are lower than the first predetermined threshold. Model training device 120 may further select several (e.g., 2, 3, 4 or 5) supporting cases to be associated with each selected baseline case. For example, if a similarity label between a baseline case and a non-baseline case is higher than a second predetermined threshold, the non-baseline case may be selected as a supporting case to associate with the baseline case. As another example, model training device 120 may select a set of non-baseline cases that have highest values in the similarity label of the similarity correlation matrix associated with the baseline case.

In step S1004, model training device 120 may generate a query embedding vector from vehicle images (e.g., preprocessed vehicle images) associated with each baseline case and a target embedding vector from vehicle images (e.g., preprocessed vehicle images) associated with each supporting case based on the model. For example, model training device 120 may apply the model to a first preprocessed vehicle image (e.g., front view) associated with a baseline case to generate a first query embedding vector to represent a damage in the front view of the baseline case. Model training device 120 may further apply the model to a second preprocessed vehicle image (e.g., left front view) associated with the baseline case to generate a second query embedding vector to represent a damage in the left front view of the baseline case. In some embodiments, model training device 120 may apply the model to eight preprocessed vehicle images associated with the baseline case to generate eight query embedding vectors to represent damages in eight view angles of the baseline case. Similarly, for supporting cases associated with the baseline cases, model training device 120 may apply the model to eight preprocessed vehicle images associated with each supporting case to generate eight target embedding vectors to represent damages in eight view angles of each supporting case. In some embodiments, model training device 120 may concatenate the embedding vectors (e.g., query embedding vectors or target embedding vectors) associated with the same vehicle (e.g., vehicle in the baseline case or the supporting case) to generate a concatenated embedding vector to represent damages to each past vehicle (e.g., a past vehicle in the baseline case or the supporting case).

In step S1006, model training device 120 may calculate a model loss based on the generated query embedding vectors and target embedding vectors. In some embodiments, for each query embedding vector, model training device 120 may calculate an average (e.g., a center) of target embedding vectors associated with the query embedding vector according to equation (4). Model training device 120 may further calculate the model loss based on the query embedding vectors and the associated averages of the target embedding vectors according to equation (3).

In step S1008, model training device 120 may select a trained model with a lowest average matching error, a highest similarity, or both to generate embedding vectors as an optimal model. Consistent with some embodiments, model training device 120 may train one or more models based on the preprocessed training data. In some embodiments, model training device 120 may evaluate the trained models and select one of them as an optimal model to generate embedding vectors for past vehicles. For example, model training device 120 may apply each model to images of a validation case Q and generate embedding vectors to represent validation case Q. Validation case Q can be a historical accident case including a past vehicle, which has not been selected as a baseline case or a supporting case for training the models. Model training device 120 may further apply each model to images of past vehicles and generate an embedding vector to represent each past vehicle. For each model, training device 120 may determine top k past vehicles whose amount of monetary losses are most similar to validation case Q based on the closeness of distances (e.g., Euclidean distance) between embedding vectors of validation case Q and each historical case including one of the k past vehicles.

In some embodiments, model training device 120 may calculate an average matching error that is a difference between a ground truth monetary loss to validation case Q and an average of the ground truth monetary losses to the top k past vehicles determined by each model. In some embodiments, model training device 120 may calculate a relative similarity based on the top k past vehicles determined by each model and a ground truth similarity according to equation (5). A trained model with the lowest average matching error, the highest relative similarity, or both may be selected as the optimal model to be applied to images of the past vehicles and output the last layer of the feature values as embedding vectors to represent the past vehicles.

Figure 11:
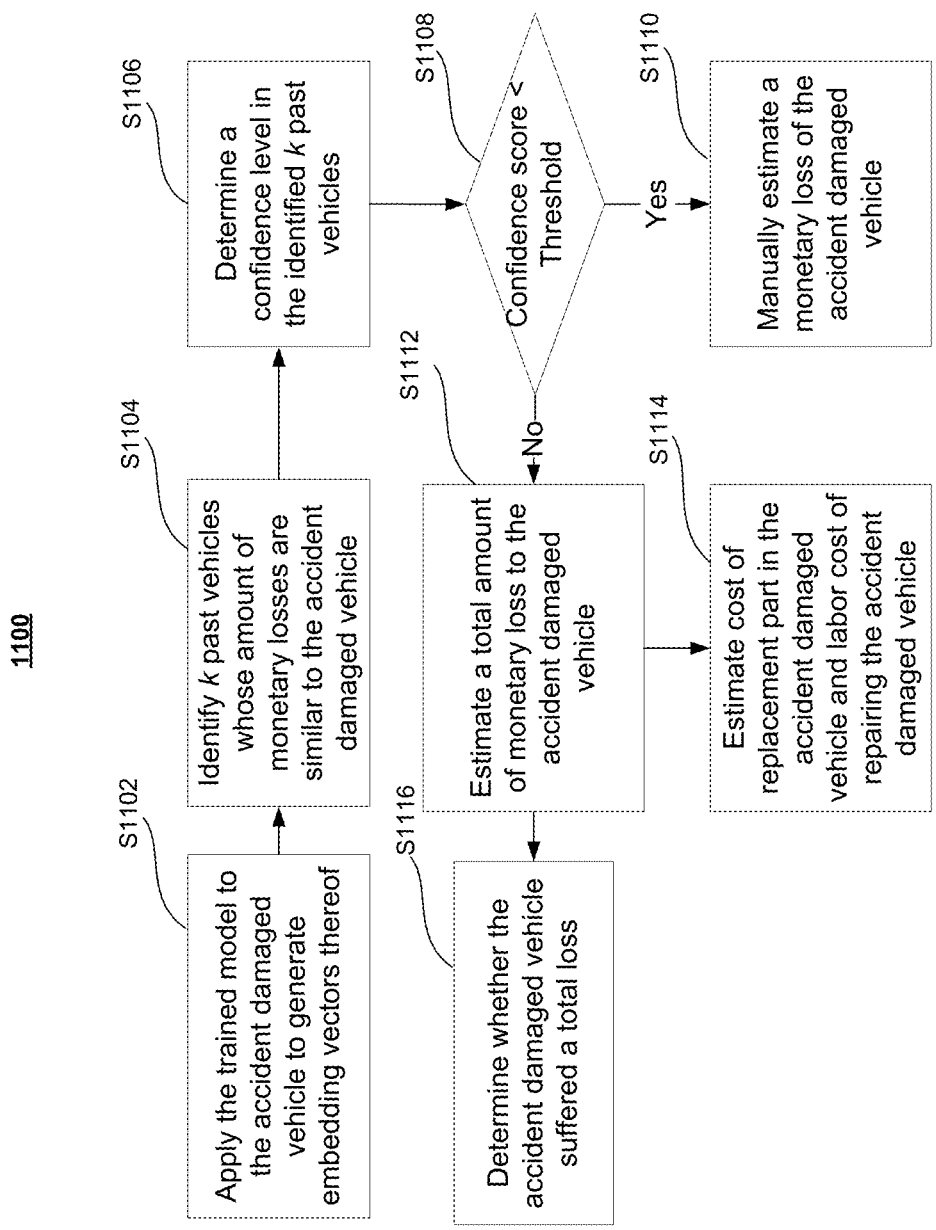
FIG. 11 is a flowchart of an exemplary method for estimating a monetary loss to an accident damaged vehicle, according to embodiments of the disclosure.

FIG. 11 is a flowchart of an exemplary method 1100 for estimating a monetary loss to an accident damaged vehicle, according to embodiments of the disclosure. Method 1100 may be performed by loss estimation device 130 and processor 704 shown in FIG. 7 (or a separate processor not shown). However, method 1100 is not limited to that exemplary embodiment and may be combined with other methods and/or devices described herein. Method 1100 may include steps S1102, S1104, S1106, S1008, S1110, S1112, S1114, S1116, and S1118 as described below. It is to be appreciated that some of the steps may be optional to perform the disclosure provided herein. Further, some of the steps may be performed simultaneously, or in a different order than shown in FIG. 11.

In step S1102, loss estimation device 130 may communicate with a database (e.g., accident database 103) to retrieve information about an accident damaged vehicle. The information may include the make and model of the accident damaged vehicle, the collision direction to the accident damaged vehicle (e.g., front, left front, etc.), preprocessed vehicle images of the accident damaged vehicle, etc. Loss estimation device 130 may further communicate with another database (e.g., training database 101) or model training device 120 to retrieve a trained model (e.g., the optimal model) and the embedding vectors of the past vehicles. Loss estimation device 130 may also apply the optimal model to the preprocessed images of the accident damaged vehicle to generate embedding vectors to represent the accident damaged vehicle.

In step S1104, loss estimation device 130 may identify k past vehicles whose amount of monetary losses are similar to the accident damaged vehicle. Consistent with some embodiments, loss estimation device 130 may use an LSH algorithm to determine a group of past vehicles that have the same or substantially same feature values of the embedding vectors as the accident damaged vehicle. Loss estimation device 130 may further use a nearest neighbor algorithm to identify k past vehicles whose amount of monetary losses are similar to the accident damaged vehicle.

In step S1106, loss estimation device 130 may determine a confidence level in the identified k past vehicles. Consistent with some embodiments, loss estimation device 130 may calculate a confidence score based on the distances between embedding vectors of the accident damaged vehicle and each of the k past vehicles. For example, the confidence score may be determined based on a variance of the distances. If the variance of the distances is large, the confidence score may be small; otherwise, the confidence score may be large.

If the confidence score is smaller than a predetermined threshold (i.e., Step S1108: Yes), loss estimation device 130 may send information of the accident damaged vehicle to a claim professional (e.g., claims adjuster). In Step 1110, the claim professional may manually review the accident damaged vehicle to estimate a total amount of monetary loss, loss on individual parts, labor cost, and whether the accident damaged vehicle suffered a total loss. If the confidence score is greater than or equal to the predetermined threshold (i.e., Step S1108: No), loss estimation device 130 may estimate the total amount of monetary loss to the accident damaged vehicle.

In step S1112, loss estimation device 130 may estimate a total amount of monetary loss to the accident damaged vehicle based on the total amount of monetary losses to the k identified past vehicles and the similarities (e.g., similarities based on a reciprocal of the distance) between the embedding vectors of the accident damaged vehicle and each of the k identified past vehicles. In some embodiments, the amount of monetary loss to each of the k identified past vehicles can be retrieved from the database (e.g., training database 101) by using the embedding vector of the past vehicle as a key. Consistent with some embodiments, the total amount of monetary loss to the accident damaged vehicle can be calculated by using a weighted total amount of monetary losses to the k identified past vehicles according to equation (6).

In step S1114, loss estimation device 130 may further estimate the cost of replacement part in the accident damaged vehicle based on the cost of replacement part in the k identified past vehicles and the similarities (e.g., similarities based on a reciprocal of the distance) between the embedding vectors of the accident damaged vehicle and each of the k identified past vehicles. In some embodiments, the cost of replacement part in each of the k identified past vehicles can be retrieved from the database (e.g., training database 101) by using the embedding vector of the past vehicle as a key. Consistent with some embodiments, the cost of replacement part in the accident damaged vehicle can be calculated by using a weighted amount of cost of replacement part in each of the k identified past vehicles. In some embodiments, labor cost of repairing the accident damaged vehicle can be estimated based on the amount of labor cost of repairing each individual part in the k identified past vehicles and the similarities (e.g., similarities based on a reciprocal of the distance) between the embedding vectors of the accident damaged vehicle and each of the k identified past vehicles.

In step S1116, loss estimation device 130 may determine whether the accident damaged vehicle suffered a total loss based on whether each of the k identified past vehicles suffered a total loss and the similarities (e.g., similarities based on a reciprocal of the distance) between the embedding vectors of the accident damaged vehicle and each of the k identified past vehicles. In some embodiments, a label that indicates whether one of the k identified past vehicles suffered a total loss can be retrieved from the database (e.g., training database 101) by using the embedding vector of the past vehicle as a key. If a past vehicle suffered a total loss, the label of total loss associated with that past vehicle may be set to 1; otherwise, the label may be set to 0. Consistent with some embodiments, loss estimation device 130 may use a weighted label of total loss of each of the k identified past vehicles to determine whether the accident damaged vehicle suffered a total loss. The similarities between the embedding vectors of the accident damaged vehicle and each of the k identified past vehicles are used to determine the weight of total loss of the corresponding identified past vehicles in the loss estimation process.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, a system for estimating an amount of monetary loss to an accident damaged vehicle is provided. The system includes a communication interface configured to receive one or more accident images taken of an accident damaged vehicle. It also includes a database for storing loss data of one or more past vehicles, and each past vehicle is associated with a historical accident. It further includes a processor coupled to the communication interface and the database. The processor is configured to detect the accident damaged vehicle in the one or more accident images, identify one or more most similar past vehicles, and estimate the amount of monetary loss to the accident damaged vehicle based on the loss data of the one or more past vehicles.

In some embodiments, the processor is further configured to detect a body area of the accident damaged vehicle in each of the accident images, and to determine a view angle of the accident damaged vehicle in each of the accident images.

In some embodiments, the processor is further configured to detect one or more vehicle parts of the accident damaged vehicle, and to merge the detected one or more vehicle parts to define a body area of the accident damaged vehicle.

In some embodiments, the processor is further configured to, prior to or during the merging of the detected one or more vehicle parts, filter out the vehicle part from a result of the detected vehicle parts if a dimension of the vehicle part is less than a first preset threshold or a distance between a centroid of the detected vehicle part and a boundary of the accident image is less than a second preset threshold.

In some embodiments, the processor is further configured to determine a view angle of the accident damaged vehicle based on a spatial relationship of the detected vehicle parts or one or more bounding boxes surrounding the body area.

In some embodiments, the processor is further configured to apply a trained model to the accident images to generate a first batch of embedding vectors associated with the accident damaged vehicle, and to compare the first of embedding vectors with a second batch of embedding vectors associated with the past vehicles to identify the one or more most similar past vehicles.

In some embodiments, the processor is further configured to retrieve, from the database, the second batch of embedding vectors associated with the past vehicles, which have been generated by the trained model.

In some embodiments, the processor is further configured to calculate a weighted average of similarity scores between the first batch of embedding vectors and the second batch of embedding vectors to identify the one or more most similar past vehicles.

In some embodiments, the loss data contain a total amount of monetary loss to each of the one or more past vehicles. The processor is further configured to calculate a weighted similarity between the accident damaged vehicle and the one or more most similar past vehicles, to retrieve, from the database, the total amount of monetary loss for each of the one or more most similar past vehicles, and to estimate the amount of monetary loss to the accident damaged vehicle based on the calculated weighted similarity and the retrieved total amount of monetary losses for the one or more most similar past vehicles.

In some embodiments, the loss data contain cost of a replacement part and labor cost corresponding to the replacement part. The processor is further configured to calculate a weighted similarity between the accident damaged vehicle and the one or more most similar past vehicles, to retrieve, from the database, the cost of a replacement part and the labor cost corresponding to the replacement part for each of the one or more most similar past vehicles, and to estimate cost for replacing a damaged vehicle part of the accident damaged vehicle and labor cost corresponding to the damaged vehicle part based on the calculated weighted similarity and the retrieved cost of a replacement part and the retrieved labor cost.

In some embodiments, the processor is further configured to determine whether the accident damaged vehicle suffered a total loss.

In some embodiments, the processor is further configured to determine a confidence level of the one or more most similar past vehicles by evaluating a variance among similarity weights calculated between the accident damaged vehicle and the one or more most similar past vehicles, and to manually determine the monetary loss to the accident damaged vehicle if the confidence level is below a predetermined threshold.

In some embodiments, the processor is further configured to generate a similarity label for each pair of the one or more past vehicles, and to compile a similarity correlation matrix using the generated similarity labels.

In some embodiments, the processor is further configured to divide the loss data of the one or more past vehicles into one or more sub-datasets, to sample data for each sub-dataset, to use the sampled data as baseline cases, to select supporting cases based on the similarity correlation matrix, and to obtain the trained model by using the baseline cases and the supporting cases.

In some embodiments, the processor is further configured to apply the trained model to a validation case to generate a validation embedding vector associated with the validation case, to calculate a similarity between the validation embedding vector and each embedding vector of the past vehicles to select one or more past vehicles for evaluation, and to evaluate the trained model by calculating at least one of an average amount of monetary losses to the selected one or more past vehicles and a relative similarity.

According to another aspect of the present disclosure, a model training device for training a model for estimating an amount of monetary loss to an accident damaged vehicle is provided. The model training device includes a communication interface configured to receive training data representative of one or more past vehicles, and each past vehicle is associated with a historical accident. It also includes a data sampling unit configured to select one or more baseline cases and one or more supporting cases associated with each selected baseline case. It further includes a model generation unit configured to obtain a trained model based on the one or more base line cases and the one or more supporting cases. The trained model is applied to the accident damaged vehicle to estimate the amount of monetary loss to the accident damaged vehicle.

In some embodiments, the model training device further includes a model evaluation unit configured to evaluate one or more intermediate models to select an optimal model. The optimal model is output as the trained model.

In some embodiments, the model training device further includes an embedding vector generation unit configured to apply the optimal model to one or more images of the one or more past vehicles to generate embedding vectors, each embedding vector associated with one past vehicle.

In some embodiments, the model evaluation unit is further configured to update the optimal model by calculating at least one of an average amount of monetary losses to the one or more past vehicles and a relative similarity.

According to yet another aspect of the present disclosure, a method for estimating an amount of monetary loss to an accident damaged vehicle is provided. The method includes receiving one or more accident images taken of the accident damaged vehicle, detecting the accident damaged vehicle in the one or more accident images, receiving loss data of one or more past vehicles, identifying one or more most similar past vehicles, and estimating the amount of monetary loss to the accident damaged vehicle based on the loss data of the one or more past vehicles.

In some embodiments, the method further includes converting each of the one or more accident images to a preprocessed images by detecting parts of the damaged vehicle in the image, determining a view angle of the damaged vehicle in the image based on the detected parts, determining a bounding box of the damaged vehicle based on the detected parts, and generating the preprocessed image based on the bounding box.

In some embodiments, the method further includes generating a similarity correlation matrix from the loss data by calculating a similarity of monetary loss between each pair of identical parts from a pair of the one or more past vehicles, calculating a similarity of monetary loss between the pair of past vehicles based on the similarities of monetary losses between each pair of identical parts in the pair of past vehicles, and generating a similarity correlation matrix based on the similarities of monetary losses between multiple pairs of the one or more past vehicles.

In some embodiments, the method further includes training a model based on the generated similarity correlation matrix by selecting one or more baseline cases and one or more supporting cases associated with each selected baseline case, generating one or more query embedding vectors from the one or more baseline cases and one or more target embedding vectors from the one or more supporting cases, calculating a model loss based on the one or more query embedding vectors and the one or more target embedding vectors, and selecting a trained model with a lowest average matching error, a highest similarity, or both.

In some embodiments, the method further includes applying the trained model to the one or more accident images to generate an embedding vector associated with the accident damaged vehicle, applying the trained model to the one or more most similar past vehicles to generate an embedding vector associated with each of the one or more most similar past vehicles, and estimating the total amount of monetary loss to the accident damaged vehicle based on total amount of monetary losses to the one or more most similar past vehicles and the similarities between the embedding vectors of the accident damaged vehicle and each of the one or more most similar past vehicles.

In some embodiments, the method further includes determining a confidence level in the one or more most similar past vehicles.

In some embodiments, the method further includes determining whether the accident damaged vehicle suffered a total loss.

According to still another aspect of the present disclosure, a non-transitory computer-readable medium is disclosed. The non-transitory computer-readable medium has instructions stored thereon. When the instructions are executed by at least one processor, the at least one processor is caused to perform a method for estimating an amount of monetary loss to an accident damaged vehicle. The method includes receiving one or more accident images taken of the accident damaged vehicle, detecting the accident damaged vehicle in the one or more accident images, receiving loss data of one or more past vehicles, identifying one or more most similar past vehicles, and estimating the amount of monetary loss to the accident damaged vehicle based on the loss data of the one or more past vehicles.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for estimating an amount of monetary loss to an accident damaged vehicle, comprising:

a communication interface configured to receive one or more accident images taken of the accident damaged vehicle;

a database for storing loss data of past vehicles, each past vehicle being associated with a historical accident; and a processor coupled to the communication interface and the database and configured to:

detect the accident damaged vehicle in the one or more accident images;

apply a trained model to identify one or more most similar past vehicles from the past vehicles; and estimate the amount of monetary loss to the accident damaged vehicle based on the loss data of the one or more most similar past vehicles, wherein the processor is further configured to:

select one or more past vehicles for evaluation from the past vehicles; and evaluate the trained model by calculating at least one of an average amount of monetary losses to the one or more past vehicles for evaluation or a relative similarity.

2. The system of claim 1, wherein the processor is further configured to:

detect a body area of the accident damaged vehicle in each of the accident images; and determine a view angle of the accident damaged vehicle in each of the accident images.

3. The system of claim 2, wherein the processor is further configured to:

detect one or more vehicle parts of the accident damaged vehicle; and merge the detected one or more vehicle parts to define a body area of the accident damaged vehicle.

4. The system of claim 3, wherein the processor is further configured to:

prior to or during the merging of the detected one or more vehicle parts, filter out the vehicle part from a result of the detected vehicle parts if a dimension of the vehicle part is less than a first preset threshold or a distance between a centroid of the detected vehicle part and a boundary of the accident image is less than a second preset threshold.

5. The system of claim 3, wherein the processor is further configured to:

determine a view angle of the accident damaged vehicle based on a spatial relationship of the detected vehicle parts or one or more bounding boxes surrounding the body area.

6. The system of claim 1, wherein the processor is further configured to:

apply the trained model to the accident images to generate a first batch of embedding vectors associated with the accident damaged vehicle; and compare the first of embedding vectors with a second batch of embedding vectors associated with the past vehicles to identify the one or more most similar past vehicles.

7. The system of claim 6, wherein the processor is further configured to:

retrieve, from the database, the second batch of embedding vectors associated with the past vehicles, which have been generated by the trained model.

8. The system of claim 6, wherein the processor is further configured to:

calculate a weighted average of similarity scores between the first batch of embedding vectors and the second batch of embedding vectors to identify the one or more most similar past vehicles.

9. The system of claim 1, wherein the loss data contain a total amount of monetary loss to each of the past vehicles, and wherein the processor is further configured to:

calculate a weighted similarity between the accident damaged vehicle and the one or more most similar past vehicles;

retrieve, from the database, the total amount of monetary loss for each of the one or more most similar past vehicles; and estimate the amount of monetary loss to the accident damaged vehicle based on the calculated weighted similarity and the retrieved total amount of monetary losses for the one or more most similar past vehicles.

10. The system of claim 9, wherein the processor is further configured to:

determine whether the accident damaged vehicle suffered a total loss.

11. The system of claim 9, wherein the processor is further configured to:

determine a confidence level of the one or more most similar past vehicles by evaluating a variance among similarity weights calculated between the accident damaged vehicle and the one or more most similar past vehicles; and manually determine the monetary loss to the accident damaged vehicle if the confidence level is below a predetermined threshold.

12. The system of claim 1, wherein the loss data contain cost of a replacement part and labor cost corresponding to the replacement part, and wherein the processor is further configured to:

calculate a weighted similarity between the accident damaged vehicle and the one or more most similar past vehicles;

retrieve, from the database, the cost of a replacement part and the labor cost corresponding to the replacement part for each of the one or more most similar past vehicles; and estimate cost for replacing a damaged vehicle part of the accident damaged vehicle and labor cost corresponding to the damaged vehicle part based on the calculated weighted similarity and the retrieved cost of a replacement part and the retrieved labor cost.

13. The system of claim 1, wherein the processor is further configured to:

generate a similarity label for each pair of the past vehicles; and compile a similarity correlation matrix using the generated similarity label for each pair of the past vehicles.

14. The system of claim 13, wherein the processor is further configured to:

divide the loss data of the past vehicles into one or more sub-datasets;

sample data for each sub-dataset;

use the sampled data as baseline cases;

select supporting cases based on the similarity correlation matrix; and obtain the trained model by using the baseline cases and the supporting cases.

15. The system of claim 14, wherein to select the one or more past vehicles for evaluation, the processor is further configured to:

apply the trained model to a validation case to generate a validation embedding vector associated with the validation case; and calculate a similarity between the validation embedding vector and each embedding vector of the past vehicles to select the one or more past vehicles for evaluation.

16. A method for estimating an amount of monetary loss to an accident damaged vehicle, comprising:

receiving one or more accident images taken of the accident damaged vehicle;

detecting the accident damaged vehicle in the one or more accident images;

receiving loss data of past vehicles;

applying a trained model to identify one or more most similar past vehicles from the past vehicles; and estimating the amount of monetary loss to the accident damaged vehicle based on the loss data of the one or more most similar past vehicles, wherein the method further comprises:

selecting one or more past vehicles for evaluation from the past vehicles; and evaluating the trained model by calculating at least one of an average amount of monetary losses to the one or more past vehicles for evaluation or a relative similarity.

17. The method of claim 16, further comprising:

converting each of the one or more accident images to a preprocessed images by:

detecting parts of the damaged vehicle in the accident image;

determining a view angle of the damaged vehicle in the accident image based on the detected parts;

determining a bounding box of the damaged vehicle based on the detected parts; and generating the preprocessed image based on the bounding box.

18. The method of claim 16, further comprising:

generating a similarity correlation matrix from the loss data by:

calculating similarities of monetary losses between multiple pairs of the past vehicles, respectively, by:

for each pair of the past vehicles, calculating a similarity of monetary loss between each pair of identical parts from the pair of the past vehicles; and calculating a similarity of monetary loss between the pair of past vehicles based on the similarity of monetary loss between each pair of identical parts in the pair of past vehicles; and generating a similarity correlation matrix based on the similarities of monetary losses between the multiple pairs of the past vehicles.

19. The method of claim 18, further comprising:

training a model based on the generated similarity correlation matrix to obtain the trained model by:

selecting one or more baseline cases and one or more supporting cases associated with each selected baseline case;

generating one or more query embedding vectors from the one or more baseline cases and one or more target embedding vectors from the one or more supporting cases;

calculating a model loss based on the one or more query embedding vectors and the one or more target embedding vectors; and selecting the trained model with a lowest average matching error, a highest similarity, or both.

20. A non-transitory computer-readable medium having instructions stored thereon that, when executed by at least one processor, causes the at least one processor to perform a method for estimating an amount of monetary loss to an accident damaged vehicle, comprising:

receiving one or more accident images taken of the accident damaged vehicle;

detecting the accident damaged vehicle in the one or more accident images;

receiving loss data of past vehicles;

applying a trained model to identify one or more most similar past vehicles from the past vehicles; and estimating the amount of monetary loss to the accident damaged vehicle based on the loss data of the one or more most similar past vehicles, wherein the method further comprises:

selecting one or more past vehicles for evaluation from the past vehicles; and evaluating the trained model by calculating at least one of an average amount of monetary losses to the one or more past vehicles for evaluation or a relative similarity.

* * * * *